United States Patent
Brady

(10) Patent No.: US 9,710,619 B2
(45) Date of Patent: Jul. 18, 2017

(54) SYSTEM AND METHOD FOR PROVIDING AN ELECTRONIC DOCUMENT

(71) Applicants: CANON INFORMATION AND IMAGING SOLUTIONS, INC., Melville, NY (US); CANON U.S.A., INC., Melville, NY (US)

(72) Inventor: Nigel Patrick Brady, Irvine, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 14/675,165

(22) Filed: Mar. 31, 2015

(65) Prior Publication Data

US 2016/0292428 A1    Oct. 6, 2016

(51) Int. Cl.
*G06F 21/10* (2013.01)
*G06F 21/62* (2013.01)

(52) U.S. Cl.
CPC ............ *G06F 21/10* (2013.01); *G06F 21/629* (2013.01); *G06F 21/6272* (2013.01)

(58) Field of Classification Search
CPC .... G06F 21/606; G06F 17/212; G06F 21/602; G06F 21/10; G06F 21/6272; G06F 21/629

(Continued)

(56) References Cited

U.S. PATENT DOCUMENTS 6,496,928 B1 * 12/2002 Deo ..................... G06F 1/3209
380/270

6,542,261 B1    4/2003 McGraw (Continued)

FOREIGN PATENT DOCUMENTS

| IN | 220427 B | 7/2008 |
|---|---|---|
| IN | 02348CH2007 A | 4/2010 |
| JP | 2006222636 A | 8/2006 |

OTHER PUBLICATIONS

My Team Works; "Mobile Business Appliance Enterprise Assets"; 2013.

(Continued)

*Primary Examiner* — Abu Sholeman
(74) *Attorney, Agent, or Firm* — Canon U.S.A., Inc. IP Division

(57) ABSTRACT

Systems, methods, and computer-readable media are provided. Some embodiments include initiating a scan operation to generate an electronic document representing a scanned physical document, encrypting the electronic document, storing the encrypted electronic document, and outputting a message. The message may include location information for locating the encrypted electronic document, a key for decrypting the encrypted electronic document, and restriction information indicating a restriction associated with the encrypted electronic document. Some embodiments include receiving the message, using the location information to obtain the encrypted electronic document, decrypting the encrypted electronic document using the key to generate an unencrypted electronic document, presenting an image of the unencrypted electronic document on a display of a computing system, and restricting availability of at least one function or feature of the computing system in accordance with the restriction information.

20 Claims, 14 Drawing Sheets

(58) Field of Classification Search
USPC .................................................. 713/189, 716
See application file for complete search history.

(56) References Cited

U.S. PATENT DOCUMENTS

| | | | |
|---|---|---|---|
| 6,751,732 B2* | 6/2004 | Strobel | G06F 21/608 380/255 |
| 6,772,338 B1 | 8/2004 | Hull | |
| 7,308,703 B2 | 12/2007 | Wright et al. | |
| 7,508,939 B2 | 3/2009 | Hashimoto | |
| 7,529,940 B1 | 5/2009 | Winkel et al. | |
| 7,707,421 B2* | 4/2010 | Labelle | H04L 63/12 705/51 |
| 7,770,220 B2 | 8/2010 | Fernstrom | |
| 7,930,407 B2 | 4/2011 | Ragnet et al. | |
| 8,243,303 B2 | 8/2012 | Kano | |
| 8,272,048 B2 | 9/2012 | Cooper et al. | |
| 8,295,482 B2 | 10/2012 | Ohara | |
| 8,384,939 B2 | 2/2013 | Patterson | |
| 8,423,615 B1 | 4/2013 | Hayes | |
| 8,576,425 B2 | 11/2013 | Partridge et al. | |
| 8,601,600 B1 | 12/2013 | Shankar et al. | |
| 8,611,928 B1 | 12/2013 | Bill | |
| 8,683,556 B2 | 3/2014 | Ingrassia, Jr. et al. | |
| 8,688,585 B2 | 4/2014 | Zaydman et al. | |
| 8,695,060 B2 | 4/2014 | Wade et al. | |
| 8,726,343 B1 | 5/2014 | Borzycki et al. | |
| 8,739,249 B1 | 5/2014 | Kay et al. | |
| 8,745,755 B2 | 6/2014 | Borzycki et al. | |
| 8,797,603 B1* | 8/2014 | Dougherty | H04N 1/2166 358/1.15 |
| 8,806,581 B2 | 8/2014 | Kiester et al. | |
| 2002/0004903 A1* | 1/2002 | Kamperman | G06F 21/10 713/182 |
| 2003/0044012 A1 | 3/2003 | Eden | |
| 2003/0099353 A1* | 5/2003 | Goh | G06Q 20/389 380/51 |
| 2004/0068470 A1 | 4/2004 | Klyne | |
| 2006/0059573 A1* | 3/2006 | Jung | G06F 21/10 726/31 |
| 2006/0088166 A1 | 4/2006 | Karusawa | |
| 2006/0117182 A1* | 6/2006 | Wolff | G06F 21/64 713/176 |
| 2007/0002885 A1* | 1/2007 | Lee | H04H 60/15 370/432 |
| 2007/0091329 A1* | 4/2007 | Zhang | H04L 29/06 358/1.1 |
| 2007/0121940 A1* | 5/2007 | Park | H04L 63/06 380/201 |
| 2007/0180020 A1* | 8/2007 | Woods | H04L 67/02 709/203 |
| 2007/0230703 A1 | 10/2007 | Barrus et al. | |
| 2007/0283446 A1 | 12/2007 | Yami et al. | |
| 2009/0070536 A1* | 3/2009 | Nasre | G06F 17/30088 711/162 |
| 2009/0103124 A1 | 4/2009 | Kimura et al. | |
| 2010/0026526 A1* | 2/2010 | Yokota | G08G 1/096827 340/996 |
| 2010/0299345 A1* | 11/2010 | Lee | H04N 7/17318 707/769 |
| 2010/0325914 A1 | 12/2010 | Peyton | |
| 2011/0010545 A1* | 1/2011 | Kill | G06F 21/10 713/168 |
| 2011/0096354 A1* | 4/2011 | Liu | G06F 3/1204 358/1.15 |
| 2011/0191858 A1 | 8/2011 | Shapiro et al. | |
| 2012/0050818 A1 | 3/2012 | Watanabe | |
| 2012/0278616 A1 | 11/2012 | Stevens | |
| 2013/0007464 A1 | 1/2013 | Madden | |
| 2013/0021643 A1 | 1/2013 | Nuggehalli et al. | |
| 2013/0035995 A1* | 2/2013 | Patterson | G06Q 10/10 705/14.4 |
| 2013/0219504 A1* | 8/2013 | Mosier | G06F 21/10 726/26 |
| 2013/0247218 A1 | 9/2013 | Jhingan et al. | |
| 2013/0250354 A1 | 9/2013 | Kato et al. | |
| 2013/0304642 A1* | 11/2013 | Campos | G06Q 20/36 705/41 |
| 2014/0156631 A1* | 6/2014 | Salvetti | G06F 17/30864 707/711 |
| 2014/0201834 A1* | 7/2014 | Conforti | G06F 21/36 726/19 |
| 2014/0259092 A1 | 9/2014 | Boucher et al. | |
| 2014/0282852 A1* | 9/2014 | Vestevich | G06F 21/6263 726/1 |
| 2014/0337528 A1* | 11/2014 | Barton | H04L 41/00 709/225 |
| 2015/0020151 A1* | 1/2015 | Ramanathan | G06F 21/6218 726/1 |
| 2015/0154484 A1* | 6/2015 | Iwasaki | G06K 15/4095 358/1.14 |
| 2015/0169266 A1* | 6/2015 | Iwasaki | G06F 3/1222 358/1.14 |
| 2015/0249651 A1* | 9/2015 | Okamoto | H04L 63/08 713/171 |
| 2016/0014157 A1* | 1/2016 | Gomez | H04L 63/20 726/1 |

OTHER PUBLICATIONS

SharePlus; "How to Open a SharePoint Document in SharePlus by Scanning a QR Code"; Jun. 26, 2012.
Lance Whitney; CNET Tech Industry; "Confide app erases your text messages after they're read"; Jan. 9, 2014.
Jason Cipriani; CNET Magazine; "How to send self-destructing messages on iOS"; Jan. 21, 2014.
EPSON; EPSON GT-S50/S80; "Scanning to a PDF File"; 2008.
EPSON; EPSON DS-30; "Scanning Using EPSON Scan"; 2012.
Canon; "Scanning the Original and Sending to a Computer"; 2013.
Canon; "Encrypting PDF Files"; 2013.
Privnote; "About Privnote"; 2013.
FileOpen Systems Inc.; "Publish to Mobile Devices Securely with FileOpen"; 2013.
SmartVault; "SmartVault is the safe and easy way to store and share your files online"; 2013.
FileOpen Systems Inc.; "Distribute documents securely to Apple iPad and iPhone"; 2013.
Good.iWare; "GoodReader for Good Application Delivers Secure Document Viewing on iPad"; Sep. 11, 2012.
Sarah Cox; Legal Support Network; "Bridging the gap between document scanning, mobility & secure file sharing"; Aug. 29, 2013.
Brainloop AG; "Brainloop Mobile for the iPad"; 2013.
Nuance; "Xerox Scan to PC Desktop"; 2013.
AirWatch; "Enterprise Mobility Best Practices: MDM, Containerization or Both?"; 2013.
AirWatch; "Mobile Content Management: Top 10 Considerations"; 2013.
LogMote; "Technology—How does it work?"; 2015.
Androidonthespot; "QRandEncryption—Rather QR codes, Public Key Encryption and You"; 2010, 2011, 2012, 2013.

* cited by examiner

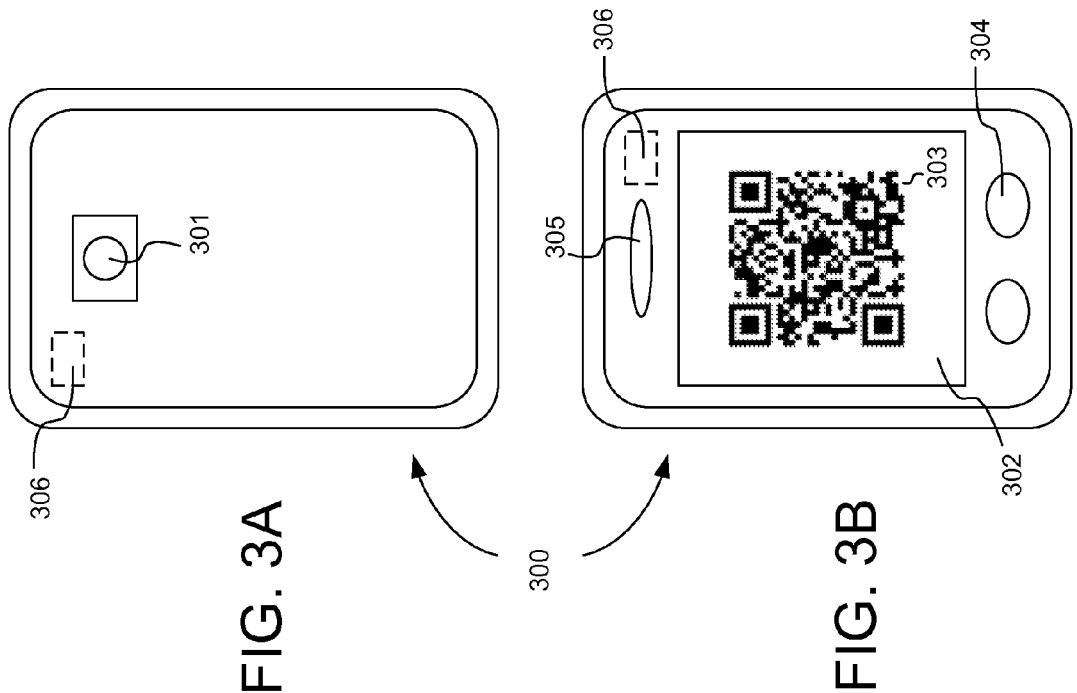
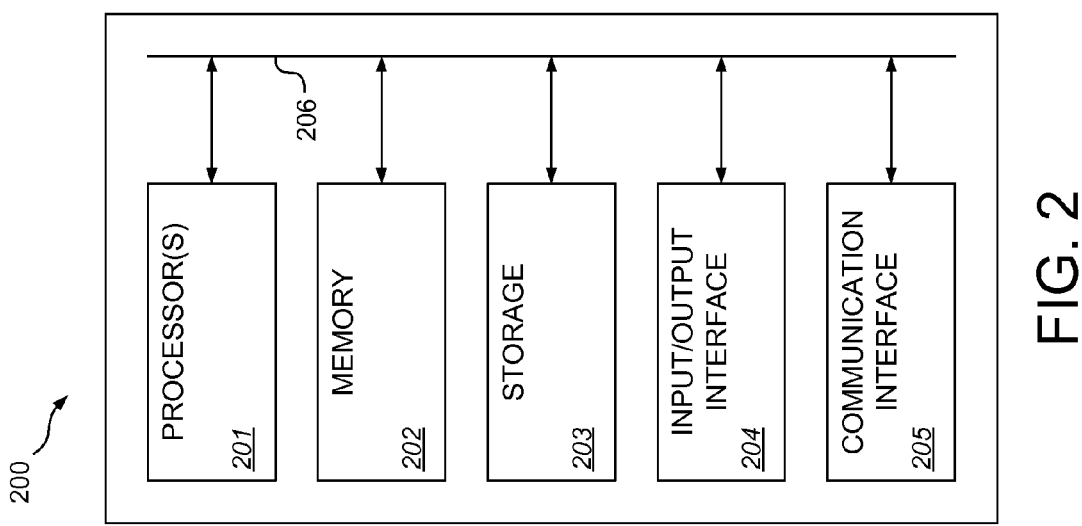

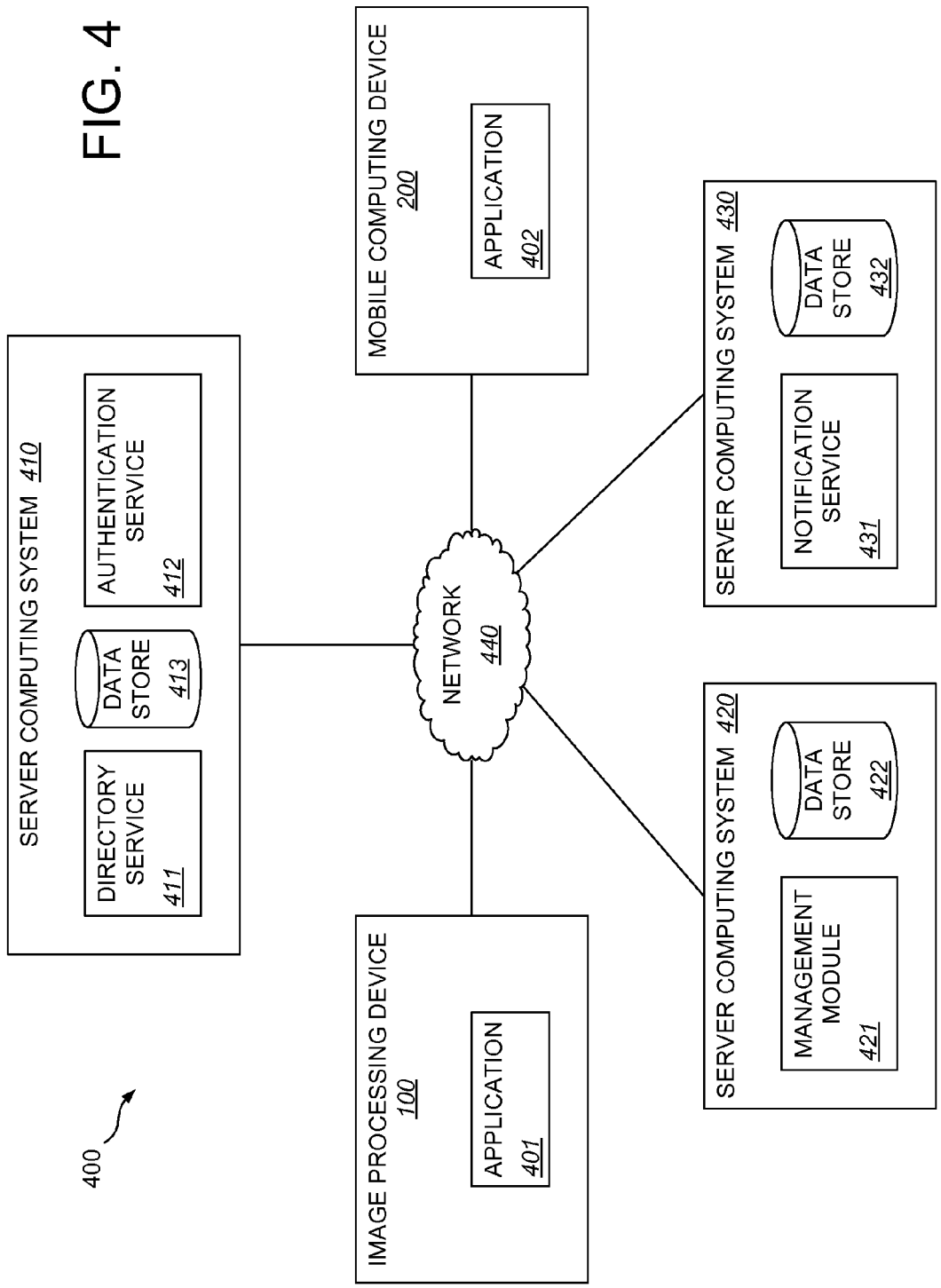

SYSTEM AND METHOD FOR PROVIDING AN ELECTRONIC DOCUMENT

BACKGROUND OF THE INVENTION

Field of the Invention

The present invention relates generally to transferring data, and more particularly to systems and methods for providing an electronic document.

Description of the Related Art

Image scanners are commonly used to optically scan physical documents. An electronic document representing the scanned physical document is generated and may be sent to a destination. For example, the electronic document may be sent to an email address as an attachment to an email or to a network location, such as a folder of a computer. In some instances, users may desire to obtain a document in electronic form on their mobile computing device. The transmission and storage of electronic documents, however, may create security concerns. For example, the scanned document may include sensitive information. Conventional methods of providing electronic documents are unsatisfactory to protect sensitive information a document may contain.

BRIEF SUMMARY OF THE INVENTION

Systems, methods, and computer-readable media for providing an electronic document are disclosed.

Some embodiments of the invention include initiating, at a computing system, a scan operation to generate an electronic document representing a scanned physical document. The electronic document is encrypted and the encrypted electronic document is stored. A message is output that includes location information, a key, and restriction information, the location information for locating the encrypted electronic document, the key for decrypting the encrypted electronic document, the restriction information indicating a restriction associated with the encrypted electronic document.

Some embodiments of the invention include receiving, at a computing system, a message that includes location information associated with an encrypted electronic document, a key for decrypting the encrypted electronic document, and restriction information indicating a restriction associated with the encrypted electronic document. The location information is used to obtain the encrypted electronic document. The encrypted electronic document is decrypted using the key to generate an unencrypted electronic document. An image of the unencrypted electronic document is presented on a display of the computing system. Availability of at least one function or feature of the computing system is restricted in accordance with the restriction information.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates an example mobile computing device.
FIGS. 3A and 3B illustrate an example mobile computing device.
FIG. 4 illustrates an example network environment.

DETAILED DESCRIPTION OF THE INVENTION

Embodiments of the present invention are described with reference to the drawings.

Figure 1A:
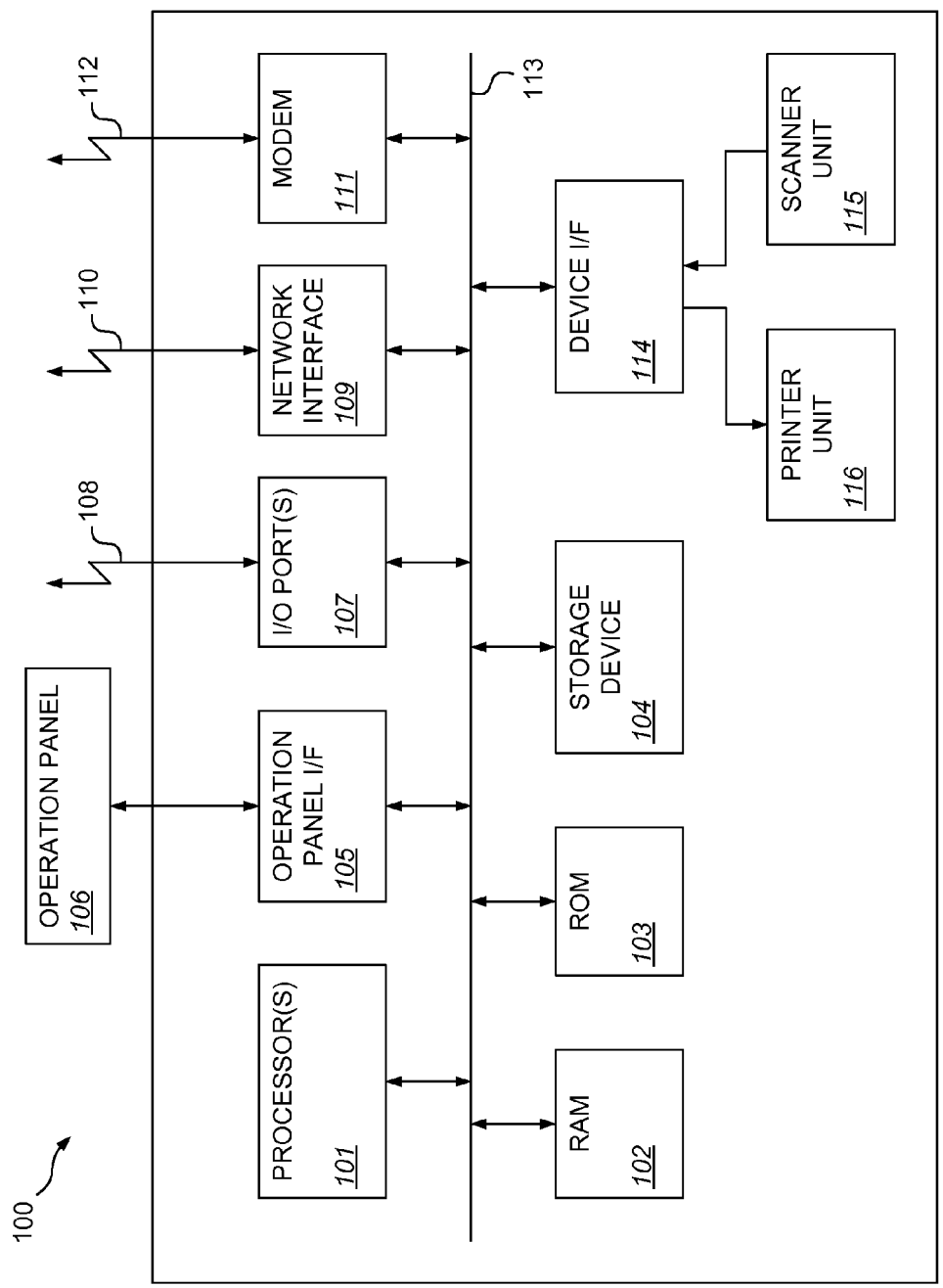
FIG. 1A illustrates an example image processing device.

FIG. 1A illustrates an example image processing device 100. The image processing device 100 of FIG. 1A is a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1A could be combined, deleted, or modified to form further implementations. Further by way of example, in some embodiments, other devices (for example, a stand-alone scanner, fax machine, or other device with scanning capabilities) and/or computing systems (for example, a computer connected to a scanner) may be implemented as the image processing device 100.

The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices.

The RAM 102 is used as a work area when the processor(s) 101 execute various instructions, such as those making up computer programs stored in the ROM 103 and/or the storage device 104. The RAM 102 may be used as a temporary storage area for various data, including input image data. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 103 may be flash memory.

The storage device 104 stores application data, program modules and other information. One or more program modules stored in the storage device 104 are configured to cause various operations and processes described herein to be executed. For example, in some embodiments, the storage device 104 stores instructions for initiating a scan operation to generate an electronic document representing a scanned physical document, encrypting the electronic document, storing the encrypted electronic document, outputting a message that includes location information for locating the encrypted electronic document, a key for decrypting the encrypted electronic document, and restriction information indicating a restriction associated with the encrypted electronic document, or a combination of these, in accordance with embodiments described herein. In some embodiments, the application 401 resides on the storage device 104 and executes on the image processing device 100.

The storage device 104 also stores other programs and data to be processed. For example, the storage device 104 stores an operating system including programs and data for managing hardware and software components of the image processing device 100. Applications on the image processing device 100 may utilize the operating system to perform various operations. The storage device 104 may further store other programs and/or drivers that enable various functions of the image processing device 100, graphical user interface (GUI) functions, and/or processor functions. The storage device 104 may also store data files including, for example, image data, user data, configuration information, GUI components, such as graphical elements or templates, or other data required by the image processing device 100.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 105 provides output signals to and receives input signals from an operation panel 106. Regarding the output signals, the operation panel interface 105 provides GUI data to the operation panel 106 for display on a liquid crystal display (LCD). Regarding the input signals, the operation panel interface 105 receives input signals based on user inputs at the operation panel 106 and relays the input signals to the processor(s) 101. In some embodiments, the operation panel 106 includes a touch sensitive element operable to receive user inputs or commands based on the touching of graphical objects displayed on the LCD. In some embodiments, the operation panel 106 includes a hard key panel. The operation panel interface 105 and the operation panel 106 are described further with reference to FIG. 1B.

Figure 1B:
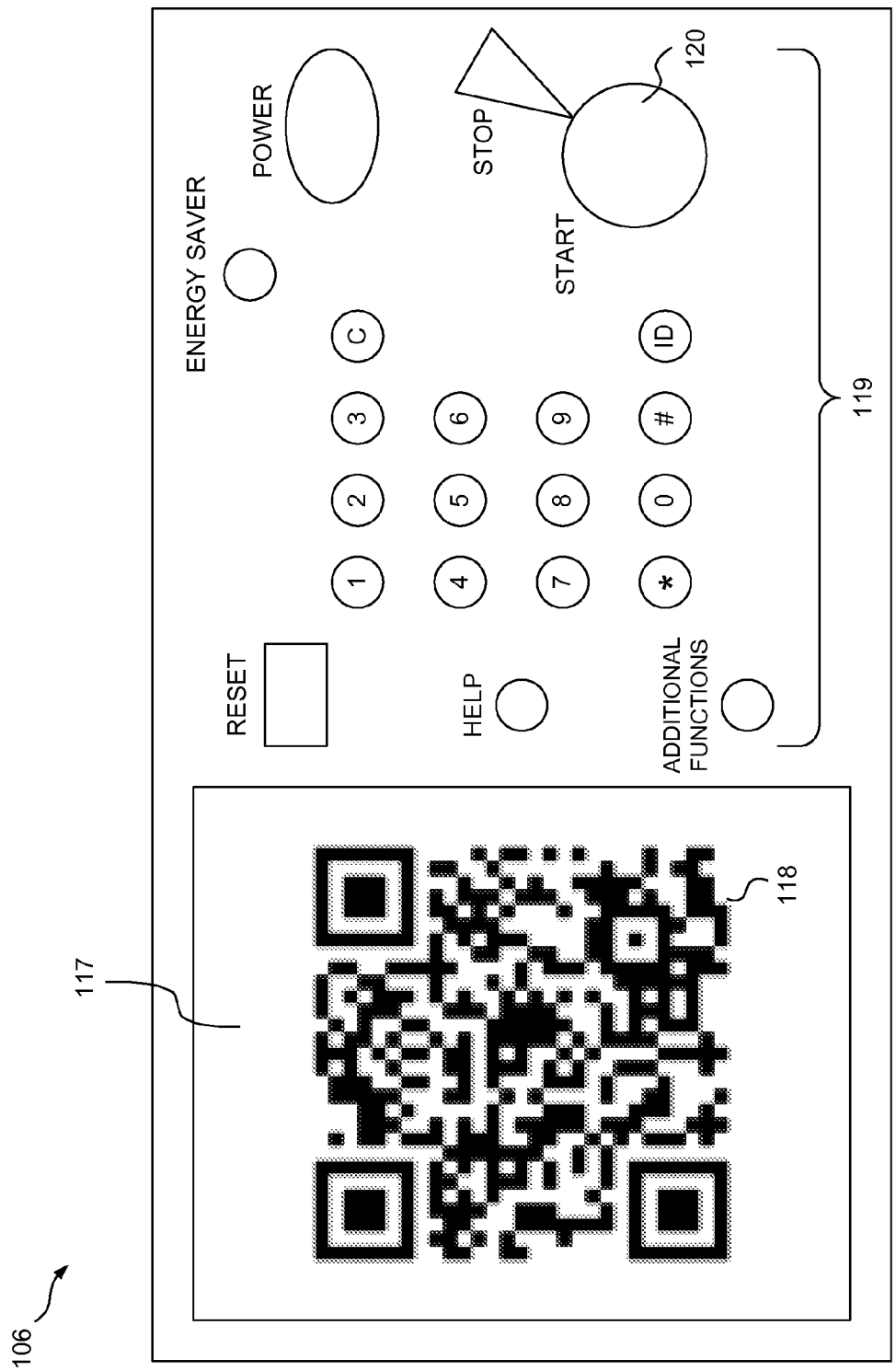
FIG. 1B illustrates an example implementation of an operation panel of the image processing device of FIG. 1A.

FIG. 1B illustrates an example implementation of the operation panel 106 of FIG. 1A. The operation panel 106 includes a display 117 and a hard key panel 119. The display 117 includes the LCD described above and a backlight which illuminates the LCD.

Regarding outputting signals to the display 117, the processor(s) 101 rasterize an image to be displayed on the display 117, and transfer the rasterized image to the display 117 via the operation panel interface 105. The display 117 then displays the image, such as a GUI. The processor(s) 101 are further operable to cause other types of images, such as images of scanned physical documents, to be displayed on the display 117. The processor(s) 101 may also turn on/off the backlight via the operation panel interface 105.

In FIG. 1B, the display 117 is shown displaying an example of a machine-readable code 118. In some embodiments of the invention, the processor(s) 101 execute instructions to present a machine-readable code on the display 117. For example, the processor(s) 101 may cause the display 117 to display a two-dimensional barcode, such as a quick response (QR) code. The machine-readable code is discussed at greater length below in connection with other figures.

Regarding receiving input signals from the operation panel 106, in some embodiments, the display 117 further includes a touch sensitive element operable to receive user inputs or commands based on the touching of interface elements presented in a GUI on the display 117. The interface element may be a graphical object displayed on the display 117. A user may touch the touch sensitive display 117 with a finger, stylus, or other tool to provide a user input. When the user touches a specific region on the touch sensitive display 117, the processor(s) 101 are notified via the operation panel interface 105 of the coordinates of the region. The processor(s) 101 determine the content of a user input based on the notified coordinates and the display contents on the display 117, and execute processing based on them.

User inputs may also be provided via the hard key panel 119. When the user presses a hard key of the hard key panel 119, the processor(s) 101 are notified via the operation panel interface 105 of information indicative of the user input. The processor(s) 101 execute processing based on the notification. While a particular hard key panel 119 is illustrated and described, other implementations may be utilized. For example, hard keys or buttons may be arranged differently. Further by way of example, input structures on the hard key panel 119 may exist in various forms including buttons, keys, switches, control pads, and so forth, depending on specific implementation requirements.

In the manner described above, a user can provide user inputs via the hard key panel 119 and/or the touch sensitive display 117 to control the image processing device 100 via the operation panel 106. For example, the user may press a start button 120 to manually initiate a scan command. Moreover, the image processing device 100 can output information to the user and issue requests (for example, a request for log-in credentials or for a user to make a selection) by outputting images on the display 117.

Referring again to FIG. 1A, the image processing device 100 includes one or more input/output (I/O) port(s) 107. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107. Examples of external devices 108 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 109 includes hardware, software, or both providing one or more interfaces for communication (such as, for example, packet-based communication) between the image processing device 100 and one or more other computing systems or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A modem 111 modulates/demodulates image data and control signals. The modem 111 is connected to the Public Switched Telephone Network (PSTN) 112 and performs input/output of information between the image processing device 100 and the PSTN 112. By way of example, the modem 111 may send/receive facsimile communications.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

The device interface 114 is connected to the scanner unit 115 and to the printer unit 116. The device interface 114 performs synchronous/asynchronous conversion of image data.

The scanner unit 115 includes a light source and an image sensor. The scanner unit 115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 115 includes an optical system (for example, mirrors, lens) that directs the light to the image sensor. After the image sensor generates the electrical signals, an analog-to-digital converter converts the electrical signals to digital image data representing the scanned physical document. The scanner unit 115 then outputs the digital image data to one or more other components of the image processing device 100 via the device interface 114.

The printer unit 116 is an image output device for printing on a sheet an image corresponding to image data. In response to a print command received at the image processing device 100, the printer unit 116 receives image data via the device interface 114 and outputs to a sheet an image corresponding to the image data.

FIG. 2 illustrates an example mobile computing device 200. The mobile computing device 200 includes one or more processor(s) 201, memory 202, storage 203, an input/output (I/O) interface 204, a communication interface 205, and a bus 206. The mobile computing device 200 may take any suitable physical form. For example, and not by way of limitation, the mobile computing device 200 may be a personal digital assistant (PDA), a mobile telephone, a laptop or notebook computer system, or a tablet computer system.

The processor(s) 201 include hardware for executing instructions, such as those making up a computer program. The processor(s) 201 may retrieve the instructions from the memory 202, the storage 203, an internal register, or an internal cache. The processor(s) 201 then decode and execute the instructions. Then, the processor(s) 201 write one or more results to the memory 202, the storage 203, the internal register, or the internal cache. The processor(s) 201 may provide the processing capability to execute the operating system, programs, user and application interfaces, and any other functions of the mobile computing device 200.

The processor(s) 201 may include a central processing unit (CPU), one or more general-purpose microprocessor(s), application-specific microprocessor(s), and/or special purpose microprocessor(s), or some combination of such processing components. The processor(s) 201 may include one or more graphics processors, video processors, audio processors and/or related chip sets.

In some embodiments, the memory 202 includes main memory for storing instructions for the processor(s) 201 to execute or data for the processor(s) 201 to operate on. By way of example, the mobile computing device 200 may load instructions from the storage 203 or another source to the memory 202. During or after execution of the instructions, the processor(s) 201 may write one or more results (which may be intermediate or final results) to the memory 202. One or more memory buses (which may each include an address bus and a data bus) may couple the processor(s) 201 to the memory 202. One or more memory management units (MMUs) may reside between the processor(s) 201 and the memory 202 and facilitate accesses to the memory 202 requested by the processor(s) 201. The memory 202 may include one or more memories. The memory 202 may be random access memory (RAM).

The storage 203 stores data and/or instructions. As an example and not by way of limitation, the storage 203 may include a hard disk drive, a floppy disk drive, flash memory, an optical disc, a magneto-optical disc, magnetic tape, or a Universal Serial Bus (USB) drive or a combination of two or more of these. In some embodiments, the storage 203 is a removable medium. In some embodiments, the storage 203 is a fixed medium. In some embodiments, the storage 203 is internal to the mobile computing device 200. In some embodiments, the storage 203 is external to the mobile computing device 200. In some embodiments, the storage 203 is non-volatile, solid-state memory. In some embodiments, the storage 203 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 203 may include one or more memory devices.

One or more program modules stored in the storage 203 may be configured to cause various operations and processes described herein to be executed. For example, in some embodiments, the storage 203 stores instructions for receiving a message, using location information included in the message to obtain an encrypted electronic document, decrypting the encrypted electronic document using a key included in the message to generate an unencrypted electronic document, presenting an image of the unencrypted electronic document on a display of the mobile computing device 200, restricting availability of at least one function or feature of the mobile computing device 200 or an application on the mobile computing device 200 based on information in the message, or a combination of these, in accordance with embodiments described herein. In some embodiments, the application 402 resides in the storage 203 and executes on the mobile computing device 200.

The I/O interface 204 includes hardware, software, or both providing one or more interfaces for communication between the mobile computing device 200 and one or more I/O devices. The mobile computing device 200 may include one or more of these I/O devices, where appropriate. One or more of these I/O devices may enable communication between a person and the mobile computing device 200. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 204 includes one or more device or software drivers enabling the processor(s) 201 to drive one or more of these I/O devices. The I/O interface 204 may include one or more I/O interfaces.

The communication interface 205 includes hardware, software, or both providing one or more interfaces for communication (such as, for example, packet-based communication) between the mobile computing device 200 and one or more other computing systems or one or more networks. As an example and not by way of limitation, the communication interface 205 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 205 for it. As an example and not by way of limitation, the mobile computing device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 200 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The mobile computing device 200 may include any suitable communication interface 205 for any of these networks, where appropriate. The communication interface 205 may include one or more communication interfaces 205.

The communication interface 205 may further include a near field communication (NFC) device, providing close range communication capabilities. The NFC device may include an antenna that allows for close range communication at relatively low data rates (for example, 424 kb/s). In some embodiments, the NFC device may also allow for close range communication at relatively high data rates (for example, 560 Mbps). In some embodiments, communication using an NFC device may occur within a range of approximately 2 to 4 cm, or, in some embodiments, the communication distance may be up to about 10 cm. As will be appreciated by those skilled in the art, close range communication using an NFC device may take place via magnetic field induction, thus allowing the NFC device to communicate with other NFC-enabled devices or to retrieve information from tags having radio frequency identification (RFID) circuitry. Additionally, magnetic field induction may also allow an NFC device to induce another NFC-enabled device that is in a passive or sleep mode into an active mode. The NFC device may exist as a stand-alone component or may be integrated into another chipset. An NFC device may operate using one or more protocols, such as the Near Field Communication Interface and Protocols (e.g., NFCIP-1), for communicating with another NFC-enabled device. The protocols may be used to adapt the communication speed and to designate one of the connected devices as an initiating device that controls and/or initiates the NFC connection.

The bus 206 interconnects various components of the mobile computing device 200 thereby enabling the transmission of data and execution of various processes. The bus 206 may include one or more types of bus structures including a memory bus or memory controller, a peripheral bus, and a local bus using any of a variety of bus architectures.

FIGS. 3A and 3B illustrate an example mobile computing device 300. The example mobile computing device 300 is one concrete example of the mobile computing device 200 described above with respect to FIG. 2.

FIG. 3A shows a rear view of the example mobile computing device 300 and FIG. 3B shows a front view of the example mobile computing device 300. The mobile computing device 300 includes a reading unit 301 (including a camera), a display 302, hard keys 304, a speaker 305, and an NFC device 306 located within the enclosure of the mobile computing device 300. Although FIGS. 3A and 3B show a particular configuration of features of the mobile computing device 300, one or more of the features could be differently arranged. For example, the reading unit 301 may be disposed on the front of the mobile computing device 300 and/or could be disposed in a different location on the front or back of the mobile computing device 300. Other components, such as the speaker 305 or hard keys 304, could also be differently arranged. Furthermore, the mobile computing device 300 may include more or less features than illustrated. For example, the mobile computing device 300 may include multiple reading units, and/or more or less hard keys 304 than shown.

The reading unit 301 is an I/O device of the mobile computing device 300. The reading unit 301 includes a camera for acquiring an image and may additionally include image processing circuitry for processing an acquired image. In some embodiments, the reading unit 301 acquires digital still or moving images, such as digital photographs or movies. In some embodiments, the reading unit 301 may be utilized in conjunction with application software in order to acquire an image of a machine-readable code (for example, a two-dimensional barcode) and decode the machine-readable code in order for the mobile computing device 300 to obtain information encoded in the machine-readable code.

The display 302 is an I/O device of the mobile computing device 300. In some embodiments, the display 302 includes a liquid crystal display (LCD) and backlight which allow for output operations such as presenting information in a graphical user interface (GUI). In some embodiments, the display 302 includes a touch sensitive element operable to receive user inputs or commands based on the touching of interface elements presented in a GUI on the display 302. The interface element may be a graphical object displayed on the display 302.

In some embodiments, the display 302 may display an image based on image data acquired by the reading unit 301. For example, the reading unit 301 may be used to capture the machine-readable code 118 image displayed on the display 117 of the image processing device 100 in FIG. 1B. When the reading unit 301 acquires the image data, the display 302 may be configured to output the digital image data as a machine-readable code image 303 on the display 302.

The hard keys 304 are I/O devices of the mobile computing device 300. A user may provide user inputs by pressing one the hard keys 304. Other user interface implementations may also be utilized. For example, hard keys or buttons may be arranged differently. Further by way of example, input structures on the mobile computing device 300 may exist in various forms including buttons, keys, control pads, and so forth, depending on specific implementation requirements.

The speaker 305 is an I/O device for transmitting audio signals, such as voice data received during a telephone call.

The NFC device 306 is a communication interface located within the enclosure of the mobile computing device 300. The NFC device 306 may be used to facilitate near-field wireless communication and data transfer between the mobile computing device 300 and another NFC-enabled device.

The mobile computing device 300 may further include one or more suitable communication interfaces for communicating with other computing devices and/or networks. As an example and not by way of limitation, the mobile computing device 300 may be configured to communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these.

FIG. 4 illustrates an example network environment 400. The image processing device 100 having an application 401, the mobile computing device 200 having an application 402, a server computing system 410 having a directory service 411, an authentication service 412 and a data store 413, a server computing system 420 having a management module 421 and a data store 422, and a server computing system 430 having a notification service 431 and a data store 432 are connected to a network 440.

The term computing system as used herein may include but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein may include but is not limited to an object that can be processed at a computing system. A resource can be a portion of executable instructions or data. Each of the image processing device 100, the mobile computing device 200, the server computing system 410, the server computing system 420, and the server computing system 430 is an example of a computing system.

The image processing device 100 includes hardware, software, or both for providing the functionality of the image processing device 100. In some embodiments, the image processing device 100 performs one or more steps of one or more methods described or illustrated herein. In some embodiments, the image processing device 100 provides functionality described or illustrated herein. In some embodiments, software running on the image processing device 100 performs one or more steps of one or more methods described or illustrated herein or provides functionality described or illustrated herein. Some embodiments include one or more portions of the image processing device 100.

In some embodiments, the image processing device 100 includes hardware, software, or both for providing scanning functionality. For example, the image processing device 100 may include an image sensor or a camera for capturing an image. In some embodiments, the image processing device 100 scans a physical document to generate electrical signals which are converted to digital image data representing the scanned physical document. The image processing device 100 may convert the digital image data into an electronic document representing the scanned physical document and send the electronic document to a destination.

The application 401 includes programs and related data. In some embodiments, the application 401 executing on the image processing device 100 performs one or more steps of one or more methods described or illustrated herein or provides functionality described or illustrated herein. By way of example and not by way of limitation, programs of the application 401 may include instructions that, when executed by one or more processors, cause the one or more processors to perform one or more operations described with respect to one or more of FIG. 5, FIG. 6, FIG. 7A, FIG. 7B, and FIG. 12.

In some embodiments, the application 401 executing on the image processing device 100 may send an encrypted electronic document in response to a request to access the encrypted electronic document. The application 401 may use any suitable protocol or method for receiving requests and transferring data in response to requests. In some embodiments, the application 401 executing on the image processing device 100 provides web server functionality. The application 401 may include one or more programs for receiving hypertext transfer protocol (HTTP) requests and providing HTTP responses. In some embodiments, the application 401 executing on the image processing device 100 provides file server functionality. The application 401 may include one or more programs for receiving File Transfer Protocol (FTP) requests and providing FTP responses.

The image processing device 100 may access one or more resources on the network 440. The image processing device 100 is configured to interact with one or more of the following: the mobile computing device 200, the server computing system 410, the server computing system 420, and the server computing system 430.

The mobile computing device 200 includes hardware, software, or both for providing the functionality of the mobile computing device 200. In some embodiments, the mobile computing device 200 performs one or more steps of one or more methods described or illustrated herein. In some embodiments, the mobile computing device 200 provides functionality described or illustrated herein. In some embodiments, software running on the mobile computing device 200 performs one or more steps of one or more methods described or illustrated herein or provides functionality described or illustrated herein. Some embodiments include one or more portions of the mobile computing device 200.

The application 402 includes programs and related data. In some embodiments, the application 402 executing on the mobile computing device 200 performs one or more steps of one or more methods described or illustrated herein or provides functionality described or illustrated herein. By way of example and not by way of limitation, programs of the application 402 may include instructions that, when executed by one or more processors, cause the one or more processors to perform one or more operations described with respect to one or more of FIG. 11 and FIG. 14.

The server computing system 410 includes hardware, software, or both for providing the functionality of the server computing system 410. The server computing system 410 may include one or more servers. For example, the server computing system 410 may include one or more application(s) servers, name servers, file servers, database servers, mail servers, or web servers. In some embodiments, the server computing system 410 is unitary. In some embodiments, the server computing system 410 is distributed. The server computing system 410 may span multiple locations. The server computing system 410 may span multiple machines.

The server computing system 410 may provide network services for entities within the network 440. In some embodiments, the server computing system 410 provides centralized management of account information and security processes for entities within the network 440. Examples of network services the server computing system 410 may provide include directory services, authentication services, naming services, and secure access to resources on the network 440. The server computing system 410 may provide one or more network services for network entities, such as computing systems or users within the network 440.

The server computing system 410 includes the directory service 411, the authentication service 412, and the data store 413. These components of the server computing system 410 reside in the server computing system 410 in any suitable manner. For example, these components may reside on one or multiple servers. In some embodiments, one or more of these components may be provided as part(s) of a software application. In some embodiments, one or more of these components may be provided as a stand-alone software application.

The directory service 411 may be used for maintaining and accessing information stored in the data store 413. In some embodiments, the data store 413 comprises a database. In some embodiments, the directory service 411 uses Lightweight Directory Access Protocol (LDAP) to interact with information in the data store 413. The directory service 411 may perform various operations with respect to the data store 413. Examples of operations include adding entries to the data store 413; deleting entries from the data store 413; modifying entries in the data store 413; searching for entries in the data store 413; and retrieving entries from the data store 413.

In some embodiments, information stored in the data store 413 is organized into a hierarchy of objects. Each object may represent an entity within the network 440. By way of example, entities within the network 440 may be users, computing devices, applications, services, groups, or other suitable entities. In some embodiments, each object has a unique identifier and contains a set of attributes. Attributes for a user account may include, for example, the user's password, a smart card identification number, group membership information indicating a group to which the user belongs, an identifier that identifies a computing device associated with the user, an identifier that identifies an application associated with the user, or other suitable information.

The authentication service 412 may be used to authenticate network entities seeking access to resources on the network 440. In some embodiments, the authentication service 412 uses the Kerberos protocol to authenticate network entities. The authentication service 412 may comprise a key distribution center (KDC). In response to a service request, the authentication service 412 may access account information of the entity that sent the service request. In some embodiments, the account information comprises an object and its attributes stored in the data store 413.

In some embodiments, an LDAP-compliant directory service is running on the server computing system 410. In some embodiments, ACTIVE DIRECTORY is running on the server computing system 410.

The server computing system 420 includes hardware, software, or both for providing the functionality of the server computing system 420. The server computing system 420 may include one or more servers. For example, the server computing system 420 may include one or more application(s) servers, web servers, file servers, or database servers. In some embodiments, the server computing system 420 is unitary. In some embodiments, the server computing system 420 is distributed. The server computing system 420 may span multiple locations. The server computing system 420 may span multiple machines.

The server computing system 420 includes the management module 421 and the data store 422. These components of the server computing system 420 reside in the server computing system 420 in any suitable manner. For example, these components may reside on one or multiple servers. In some embodiments, one or both of these components may be provided as part(s) of a software application. In some embodiments, one or both of these components may be provided as a stand-alone software application.

The server computing system 420 provides access to the management module 421. The management module 421 includes programs and related data. In some embodiments, the management module 421 provides functionality for maintaining and accessing information stored in the data store 422. The management module 421 may perform various operations with respect to the data store 422. Examples of operations include adding entries to the data store 422; deleting entries from the data store 422; modifying entries in the data store 422; searching for entries in the data store 422; and retrieving entries from the data store 422.

In some embodiments, the management module 421 provides functionality for storing a file in the data store 422 and for retrieving a file from the data store 422. The file may be an electronic document or other suitable file. Additionally, the management module 421 may provide functionality for storing information associated with the file in the data store 422. Examples of information associated with the file include information that identifies the file and information for locating the file. The information associated with the file may include one or more of the following: a uniform resource locator (URL) of the file, a file name, a file path, or other suitable information. The information in the data store 422 may be organized in any suitable manner.

In some embodiments, the image processing device 100 is configured to send, to the server computing system 420, a file and a request to store the file. The file may be an encrypted electronic document. The file may be sent from the image processing device 100 to the server computing system 420 using any suitable protocol. In response to receiving the file and the request at the server computing system 420, the management module 421 executing on the server computing system 420 may store the file in the data store 422. Information associated with the file may also be stored in the data store 422. In some embodiments, the management module 421 executing on the server computing system 420 sends information associated with the stored file to the image processing device 100. For example, the management module 421 may send a URL of the file to the image processing device 100.

In some embodiments, the mobile computing device 200 is configured to send, to the server computing system 420, a request to access the file. In response to receiving the request at the server computing system 420, the management module 421 executing on the server computing system 420 may retrieve the file from the data store 422 and send the file to the mobile computing device 200. The management module 421 may use any suitable protocol or method for receiving requests and transferring data in response to requests. In some embodiments, the management module 421 executing on the server computing system 420 provides web server functionality. The management module 421 may include one or more programs for receiving HTTP requests and providing HTTP responses. In some embodiments, the management module 421 executing on the server computing system 420 provides file server functionality. The management module 421 may include one or more programs for receiving FTP requests and providing FTP responses.

The server computing system 430 includes hardware, software, or both for providing the functionality of the server computing system 430. The server computing system 430 may include one or more servers. For example, the server computing system 430 may include one or more application(s) servers, web servers, file servers, or database servers. In some embodiments, the server computing system 430 is unitary. In some embodiments, the server computing system 430 is distributed. The server computing system 430 may span multiple locations. The server computing system 430 may span multiple machines.

The server computing system 430 includes the notification service 431 and the data store 432. These components of the server computing system 430 reside in the server computing system 430 in any suitable manner. For example, these components may reside on one or multiple servers. In some embodiments, one or both of these components may be provided as part(s) of a software application. In some embodiments, one or both of these components may be provided as a stand-alone software application.

In some embodiments, the notification service 431 provides functionality for receiving a message and a request to send the message to a destination. In response to receiving the message and the request, the notification service 431 executing on the server computing system 430 sends the message to the destination. For example, a first computing system may send the message and the request to the notification service 431. In some embodiments, the first computing system specifies the destination to which the notification service 431 should send the message. For example, the first computing system may send the message to be sent to a destination together with an identifier that identifies the destination. The identifier may identify a second computing system or an application on the second computing system as the destination. The notification service 431 executing on the server computing system 430 then sends the message to the second computing system based on the identifier.

In some embodiments, the server computing system 430 provides services for entities that are registered with the server computing system 430. For example, a first computing system may send to the server computing system 430 a message and a request to send the message to a second computing system. In some embodiments, the notification service 431 executing on the server computing system 430 will send the message to the second computing system in response to the request only if the first computing system has already registered with the server computing system 430. In some embodiments, the notification service 431 executing on the server computing system 430 will send the message to the second computing system in response to the request only if the second computing system has already registered with the server computing system 430. In some embodiments, the notification service 431 executing on the server computing system 430 will send the message to the second computing system in response to the request only if both the first computing system and the second computing system have already registered with the server computing system 430.

The notification service 431 may include functionality for maintaining and accessing information stored in the data store 432. For example, the notification service 431 may perform various operations with respect to the data store 432 in order to register a computing system with the server computing system 430, to maintain information associated with a registered computing system, or to provide a service for a registered computing system. Examples of operations include adding entries to the data store 432; deleting entries from the data store 432; modifying entries in the data store 432; searching for entries in the data store 432; and retrieving entries from the data store 432.

The network 440 couples one or more servers and one or more clients to each other. The network 440 may be any suitable network. For example, one or more portions of the network 440 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 440 may include one or more networks.

Figure 5:
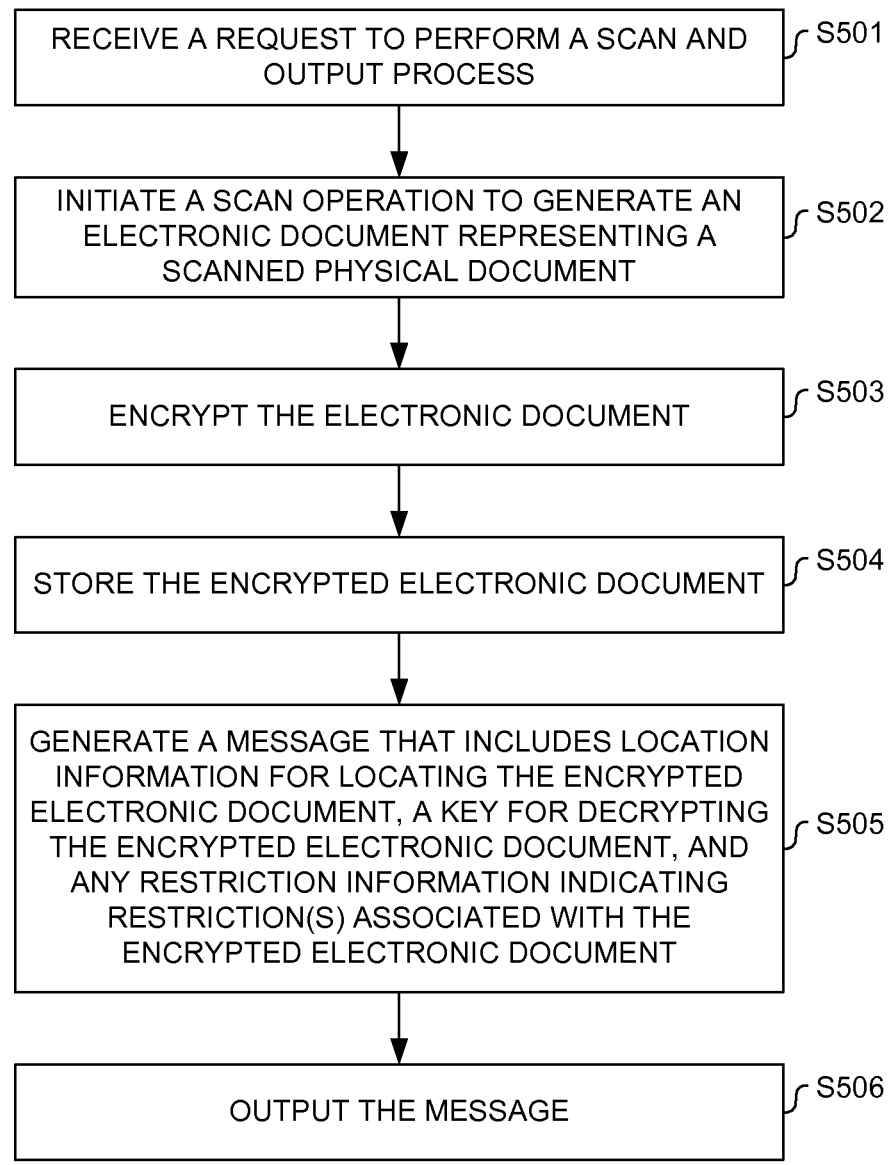
FIG. 5 illustrates an example flow of operations at an image processing device.

FIG. 5 is described with reference to the example network environment 400 of FIG. 4. FIG. 5 illustrates an example flow of operations at the image processing device 100. One or more of the steps of FIG. 5 may be performed based on or in accordance with default settings for the application 401, a predetermined policy, one or more inputs indicating one or more user selections, or a combination of two or more of these.

In step S501, a request to perform a scan and output process is received at the image processing device 100. In some embodiments, the request to perform the scan and output process comprises an instruction to scan a physical document and output information enabling a mobile computing device to obtain an electronic document representing the scanned physical document. The request to perform the scan and output process is received at the image processing device 100 while the application 401 is executing on the image processing device 100.

In some embodiments, the request to perform the scan and output process is based on one or more inputs received via the operation panel 106 of the image processing device 100. The one or more inputs may include a user input via the hard key panel 119 of the image processing device 100. For example, the user may press the start button 120 in order to submit the request to perform the scan and output process. The one or more inputs may include a user input via the touch sensitive display 117 of the image processing device 100. For example, the user may touch an interface element displayed on the touch sensitive display 117 in order to submit the request to perform the scan and output process. The request to perform the scan and output process may include an instruction to perform an image scan operation on one or more physical documents placed in an automatic document feeder (ADF) of the image processing device 100.

In some embodiments, the request to perform the scan and output process is received while a user is logged in to the image processing device 100, the application 401, or both the image processing device 100 and the application 401. For example, a login process may be performed at the image processing device 100. By virtue of the login process, access to one or more resources on the image processing device 100 may be granted based on a credential associated with a user. In some embodiments, the request to perform the scan and output process is received in step S501 after a login process has been performed. By way of example and not by way of limitation, operations of FIG. 6 may be performed as a login process.

Figure 6:
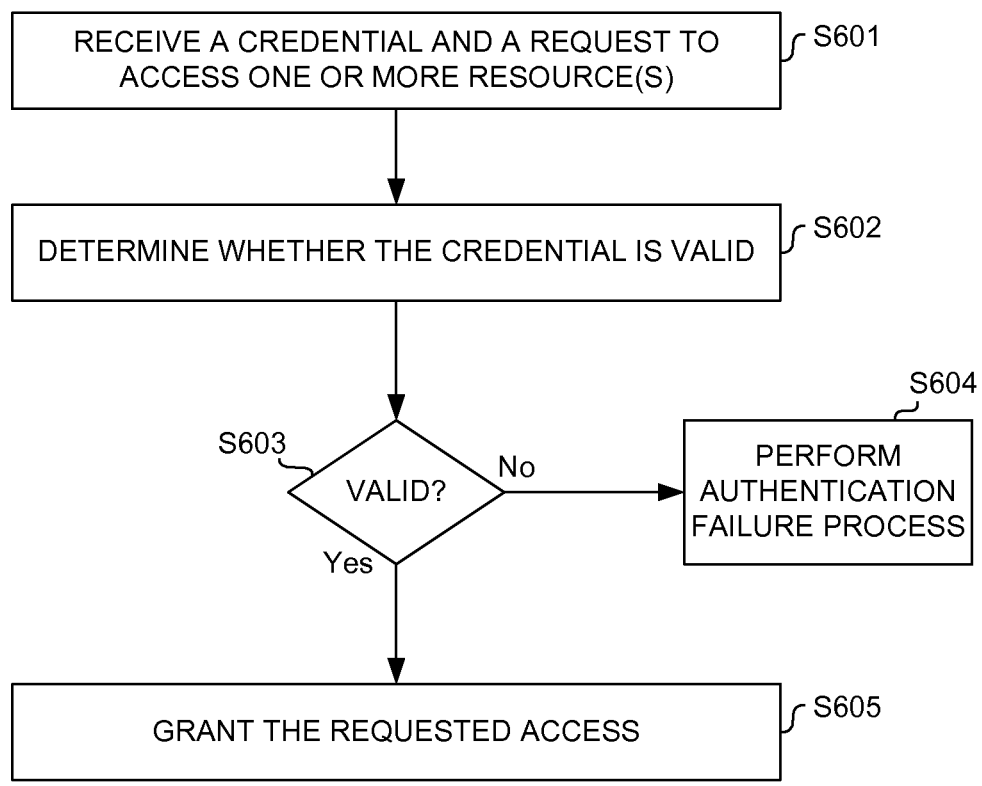
FIG. 6 illustrates an example flow of operations at an image processing device.

FIG. 6 illustrates an example flow of operations at the image processing device 100. In step S601, a credential and a request to access one or more resources on the image processing device 100 are received at the image processing device 100. Examples of the credential include the following: user identification information (for example, a username), a password, security token information (for example, a token identifier such as the identification number of a smart card), a PIN, biometric information, a certificate, other information associated with a user, or a combination of two or more of these.

In some embodiments, step S601 includes receiving the credential from a user. Information may be presented on the display 117 of the image processing device 100 enabling a user to sign in to one or both of the image processing device 100 and the application 401. The information may include form elements for inputting a credential such as a username and password. The user may provide one or more inputs at the operation panel 106 of the image processing device 100. For example, the user may input a username and password by providing touch inputs to interface elements displayed on the touch sensitive display 117 and/or by pressing one or more hard keys on the hard key panel 119. Additionally or alternatively, a user may provide one or more inputs via the I/O port(s) 107 of the image processing device 100 that enable the external device(s) 108 to communicate with the image processing device 100. For example, the user may provide information to the image processing device 100 via an NFC reader, a smart card reader, RFID reader, device for detecting biometric information, a keyboard, or other suitable external device connected to the image processing device 100 via the I/O port(s) 107.

In some embodiments, step S601 includes retrieving the credential. For example, the application 401 executing on the image processing device 100 may provide functionality for retrieving the credential from a storage location, such as a memory on the image processing device 100 or a remote storage location. The application 401 executing on the image processing device 100 may retrieve the credential in response to receiving an event notification. For example, the application 401 may include single sign-on functionality and may retrieve the credential in response to receiving notification of a user login event.

In step S602, it is determined whether the credential received in step S601 is valid. In some embodiments, the application 401 executing on the image processing device 100 determines whether the credential is valid in response to receiving the credential in step S601.

In some embodiments, step S602 includes using an authentication service to determine whether the credential is valid. For example, the application 401 executing on the image processing device 100 may send the credential to the authentication service 412 with a request to authenticate the user. The authentication service 412 may use the Kerberos protocol or other suitable authentication method to authenticate the user. The authentication service 412 then sends an authentication response to the application 401 indicating whether the authentication was successful or the authentication failed. If the authentication was successful, the application 401 determines that the credential is valid. On the other hand, if the authentication failed, the application 401 determines that the credential is not valid.

In some embodiments, step S602 includes determining whether the credential is valid by comparing the credential to user information on an access control list stored locally. Based on the comparison, the application 401 may determine, for example, the credential is valid in a case the credential matches some user information on the access control list, or the credential is not valid in a case the credential does not match some user information on the access control list.

In step S603, in response to determining that the credential is not valid (No in step S603), the process advances to step S604. In step S604, an authentication failure process is performed in response to the authentication failure. For example, the application 401 executing on the image processing device 100 may prepare and present on the display 117 information that provides a message to a user that authentication has failed or that the user is denied access to one or more resources on the image processing device 100. The message may include a request that the user provide a credential again, for example. On the other hand, in response to determining that the credential is valid (Yes in step S603), the process advances to step S605.

In step S605, the user is granted access to one or more resources on the image processing device 100. For example, the user may be granted access to one or more resources of the application 401 and/or one or more resources of the image processing device 100. In some embodiments, the user is logged in to the application 401. In some embodiments, the user is logged in to the image processing device 100. In some embodiments, the user is logged in to both the application 401 and the image processing device 100.

Referring again to FIG. 5, in some embodiments, step S501 includes receiving information pertaining to the scan operation. For example, the request to perform the scan and output process may include scan settings pertaining to a resolution of the scan, color or black and white settings, contrast settings, file type settings for the electronic document resulting from the scan operation, or other scan settings for the scan operation. The scan settings may be preset or default settings stored in the image processing device 100. In some embodiments, the scan settings may be custom settings set in the image processing device 100 by a user via the operation panel 106 of the image processing device 100.

In step S502, a scan operation to generate an electronic document representing a scanned physical document is initiated at the image processing device 100. For example, a command to execute a scan operation may be sent to the scanner unit 115 of the image processing device 100 in response to the request received in step S501. In some embodiments, the application 401 executing on the image processing device 100 initiates the scan operation in response to receiving the request to perform the scan and output process.

In some embodiments, the image processing device 100 scans one or more physical documents. A physical document may, for example, be placed on a glass platen or in an ADF of the image processing device 100. In some embodiments, multiple physical documents have been placed in the ADF of the image processing device 100. The scanner unit 115 of the image processing device 100 performs a scan operation on successive sheets of the one or more physical documents. An image sensor scans each physical document to generate electrical signals which are converted to digital image data representing each scanned physical document. The digital image data is converted into an electronic document representing the one or more scanned physical documents.

In some embodiments, in converting the digital image data into the electronic document, the processor(s) 101 of the image processing device 100 perform format conversion processing. For example, the processor(s) 101 of the image processing device 100 may convert the digital image data to an electronic document in a particular file format, such as portable document format (PDF), a TIFF file format, or some other file format for storing the electronic document or sending the electronic document to a destination. In some embodiments, the image processing device 100 executes one or more other image processing techniques on the electronic document, such as optical character recognition (OCR).

Instructions for performing file format conversion or for performing various image processing techniques may be stored in the storage device 104 of the image processing device 100 and may be executed by the processor(s) 101 of the image processing device 100. For example, a program of the application 401 may include instructions for performing file format conversion or various image processing techniques. In some embodiments, an application different from the application 401 resides on the storage device 104 and executes on the image processing device 100 to perform file format conversion or image processing.

In some embodiments, commands for performing format conversion or image processing techniques may be included in the request to perform the scan and output process. For example, the request to perform the scan and output process may indicate a format into which the digital image data should be converted for sending the electronic document representing the scanned physical document(s) to a destination. In some embodiments, the instructions for performing file format conversion or for performing various image processing techniques may be based on one or more inputs via the operation panel 106 of the image processing device 100, the one or more inputs indicating one or more user selections. In some embodiments, the file format conversion or image processing is based on default settings for the application 401 or the image processing device 100. After one or more physical documents are scanned and the electronic document representing the scanned physical document(s) is generated, the process advances to step S503.

In step S503, the electronic document generated in step S502 is encrypted. Any suitable encryption scheme may be used for encrypting the electronic document. In some embodiments, one or more programs of the application 401 include instructions for encrypting the electronic document. In some embodiments, step S503 includes generating a cryptographic key and encrypting the electronic document using an algorithm and the generated key. The key may be a symmetric key that can be used for both encrypting the electronic document and decrypting the encrypted electronic document. In some embodiments, the encryption algorithm is a symmetric-key algorithm.

According to some embodiments, the application 401 executing on the image processing device 100 generates the key for encrypting the electronic document. In various embodiments, the application 401 generates random or pseudo-random data. Pseudo-random data may be generated using a seed value. In some embodiments, the encryption key is generated from the seed value. The seed value may be based on arbitrary data. In some embodiments, the seed value is based on data available to the image processing device 100. For example, the seed value may include data related to a user (for example, a user identifier), data identifying a date and time, data related to the electronic document (for example, a file name or metadata), or other suitable data. Random data or an arbitrary character string may be appended to the seed data. In some embodiments, the application 401 generates random or pseudo-random data to use as the encryption key. In some embodiments, step S503 includes generating the encryption key using a one-way function. For example, the encryption key may be generated by applying a one-way function to the random or pseudo-random data. The one-way function may be a type of hash function.

In some embodiments, step S503 includes using a service to perform one or more operations. For example, the application 401 executing on the image processing device 100 may send a request to a service to generate an encryption key. In some embodiments, the application 401 sends to the service a seed value and a request to generate an encryption key using the seed value. In response to the request, the service may generate the encryption key and send the encryption key to the application 401. The application 401 then encrypts the electronic document using an algorithm and the encryption key generated by the service. Further by way of example, the application 401 executing on the image processing device 100 may send a request to a service to generate random or pseudo-random data. The service may include a random number generator or a pseudo-random number generator. In response to the request, the service may generate random or pseudo-random data and send the generated random data to the application 401. In some embodiments, the application 401 uses the random or pseudo-random data generated by the service as the encryption key. Further by way of example, the application 401 executing on the image processing device 100 may send a request to a service to encrypt the electronic document generated in step S502. For example, the service may generate or may be provided with an encryption key and, in response to the request to encrypt the electronic document, the service may use the encryption key and an algorithm, such as a symmetric-key algorithm, to encrypt the electronic document. The service then provides the encrypted electronic document to the application 401.

In some embodiments, step S503 includes storing the encryption key used to encrypt the electronic document in step S503. The encryption key may be stored in any suitable memory or storage location. In some embodiments, the application 401 executing on the image processing device 100 stores the encryption key in memory on the image processing device 100. For example, the encryption key may be stored in a cache which may be located in an area of volatile memory. In some embodiments, the application 401 executing on the image processing device 100 may store the encryption key in a file system, which may be on a hard disk drive or other storage device.

In some embodiments, one or more operations of step S503 may be performed based on or in accordance with default settings for the application 401. For example, a default setting for the application 401 may be to automatically perform encryption of the scanned electronic document unless a setting is modified manually to turn off the automatic encryption. In some embodiments, automatic encryption of the scanned electronic document may be performed based on preset or default settings associated with the user logged in to the application 401.

In some embodiments, one or more operations of step S503 may be performed based on or in accordance with a predetermined policy. For example, automatic encryption of the scanned electronic document may be performed based on the user logged in to the application 401 satisfying predefined criteria. The encryption of the electronic document may be triggered, for example, based on group membership information associated with the user. In some embodiments, the predefined criteria may be satisfied based on a user belonging to a predetermined group. In some embodiments, the predefined criteria may be satisfied based on a user not belonging to a predetermined group, such as an administrator group. In some embodiments, a policy may be set triggering automatic encryption of the scanned electronic document for all registered users regardless of group membership. Policies for controlling access to various resources of the application 401 may be stored at the image processing device 100, or another suitable location on the network 440, such as the data store 413 on the server computing system 410.

In some embodiments, one or more operations of step S503 may be performed based on or in accordance with one or more inputs indicating one or more user selections. For example, encryption of the scanned electronic document may be performed based on custom settings for the application 401 set by a user via the operation panel 106 of the image processing device 100. A user may provide one or more inputs via the hard key panel 119 and/or the touch sensitive display 117 of the image processing device 100. For example, an interface element may be presented on the touch sensitive display 117 enabling a user to specify that encryption of a scanned electronic document should be performed by selecting the interface element. The user may provide a user input to the interface element by touching a portion of the display 117 where the interface element is presented. The user may touch the display 117 with a finger, stylus, or other tool. Alternatively or additionally, a mouse, a keyboard, or other input device may be used to position a cursor or other indicator over an interface element and then provide a user input to the interface element. Based on the user input indicating selection of the interface element, the user may specify that encryption of the scanned electronic document should be performed.

In step S504, the encrypted electronic document generated in step S503 is stored. That is, the encrypted electronic document stored in step S504 is the encrypted electronic document resulting from encrypting the electronic document in step S503. In some embodiments, storing the encrypted electronic document in step S504 includes storing the encrypted electronic document on the image processing device 100. In some embodiments, storing the encrypted electronic document in step S504 includes using a server computing system to store the encrypted electronic document. In some embodiments, step S504 includes storing location information associated with the encrypted electronic document stored in step S504. The location information may be information for locating the encrypted electronic document and/or information usable by a computing system to obtain the encrypted electronic document stored in step S504. According to some embodiments, one or more programs of the application 401 include instructions for performing one or more of the operations of step S504.

Figure 7A:
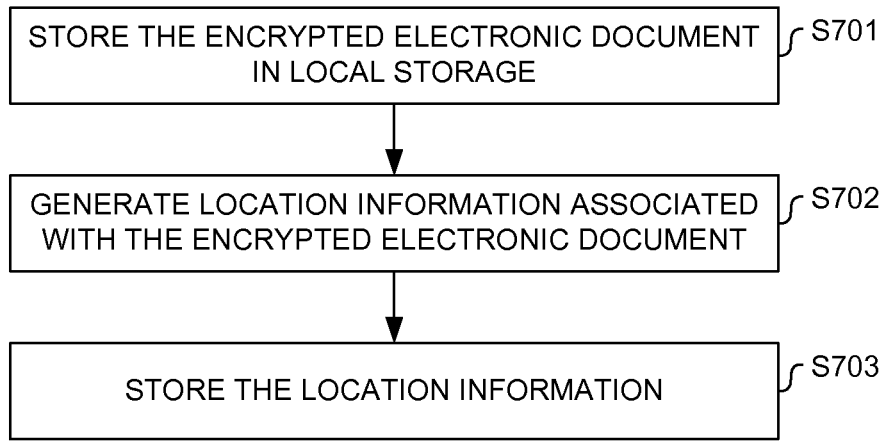
FIG. 7A illustrates an example flow of operations at an image processing device.
Figure 7B:
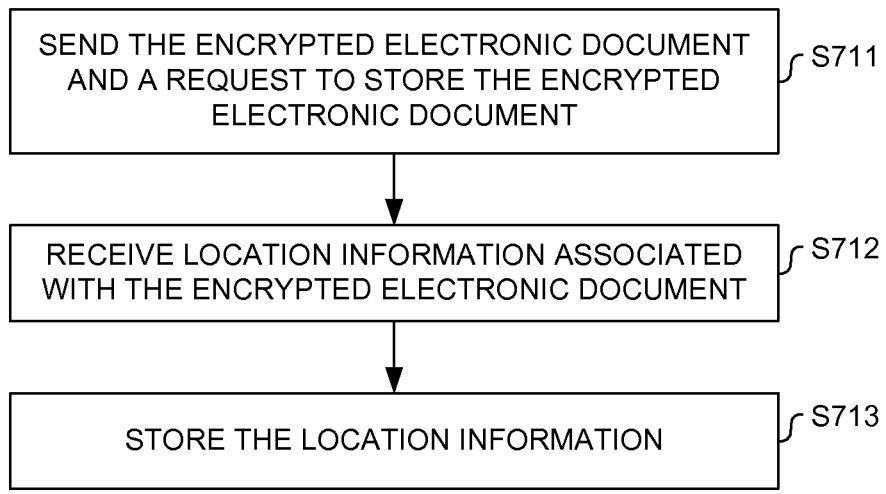
FIG. 7B illustrates an example flow of operations at an image processing device.

Step S504 is described further with reference to FIG. 7A and FIG. 7B. The operations of FIG. 7A represent a first implementation of step S504. And the operations of FIG. 7B represent a second implementation of step S504.

FIG. 7A illustrates an example flow of operations at the image processing device 100. According to some embodiments, step S504 includes performing one or more of the operations of FIG. 7A. For example, step S504 may include performing steps S701, S702 and S703 of FIG. 7A.

In step S701, the encrypted electronic document generated in step S503 is stored in local storage on the image processing device 100. By way of example and not by way of limitation, the encrypted electronic document may be stored in a file system, a database, a document management system, or other suitable data store on the image processing device 100. In some embodiments, the encrypted electronic document is stored on the storage device 104 of the image processing device 100.

In step S702, location information associated with the encrypted electronic document stored in step S701 is generated. The location information may be information for locating the encrypted electronic document stored in step S701. By way of example and not by way of limitation, the location information associated with the encrypted electronic document may include a URL constituting a reference to the encrypted electronic document, a path specifying a location in a file system on the image processing device 100, a name of the encrypted electronic document, other suitable information usable by a computing system to obtain the encrypted electronic document, or a combination of two or more of these. In some embodiments, the image processing device 100 includes a web server for receiving HTTP requests and providing HTTP responses, and the location information is a URL associated with the web server. In some embodiments, the image processing device 100 includes a FTP server for receiving FTP requests and providing FTP responses, and the location information is a URL associated with the FTP server.

In step S703, the location information generated in step S702 is stored. The location information generated in step S702 may be stored in any suitable memory or storage location. In some embodiments, the location information generated in step S702 is stored in memory on the image processing device 100. For example, the location information generated in step S702 may be stored in a cache, which may be located in an area of volatile memory. In some embodiments, the location information generated in step S702 is stored in a database, a directory, or other suitable data store on the image processing device 100. In some embodiments, the location information generated in step S702 is stored on the storage device 104 of the image processing device 100.

FIG. 7B illustrates an example flow of operations at the image processing device 100. According to some embodiments, step S504 includes performing one or more of the operations of FIG. 7B. For example, step S504 may include performing steps S711, S712 and S713 of FIG. 7B.

In step S711, the encrypted electronic document generated in step S503 and a request to store the encrypted electronic document are sent to a server computing system. For example, the application 401 executing on the image processing device 100 may send to the server computing system 420 the encrypted electronic document and a request to store the encrypted electronic document. In some embodiments, the application 401 executing on the image processing device 100 identifies the server computing system 420 based on information indicating the server computing system 420 as a destination for storing files. By way of example, the information may include a hostname, Internet Protocol (IP) address, or other suitable information that identifies the server computing system 420. The information that identifies the server computing system 420 may be stored as a configuration parameter associated with the application 401. In some embodiments, the information that identifies the server computing system 420 is stored locally on the image processing device 100. In some embodiments, the information that identifies the server computing system 420 is stored remotely. For example, the information that identifies the server computing system 420 may be stored in the data store 413 on the server computing system 410; and the image processing device 100 may access the information that identifies the server computing system 420 using the directory service 411 to retrieve the information that identifies the server computing system 420.

In response to receiving, at the server computing system 420, the encrypted electronic document and the request sent in step S711, the management module 421 executing on the server computing system 420 may store the encrypted electronic document in the data store 422. Location information associated with the encrypted electronic document may also be stored in the data store 422. The management module 421 executing on the server computing system 420 may send the location information associated with the stored encrypted electronic document to the image processing device 100.

In step S712, the location information associated with the encrypted electronic document is received at the image processing device 100. In some embodiments, the management module 421 executing on the server computing system 420 sends the location information associated with the encrypted electronic document to the image processing device 100. The location information associated with the encrypted electronic document may be information for locating the encrypted electronic document. In some embodiments, the location information associated with the encrypted electronic document is information for locating the encrypted electronic document which is stored at the server computing system 420. By way of example and not by way of limitation, the location information associated with the encrypted electronic document may include a URL constituting a reference to the encrypted electronic document, a path specifying a location in a file system, a name of the encrypted electronic document, other suitable information usable by a computing system to obtain the encrypted electronic document, or a combination of two or more of these. In some embodiments, the server computing system 420 includes a web server for receiving HTTP requests and providing HTTP responses, and the location information is a URL associated with the web server. In some embodiments, the server computing system 420 includes a FTP server for receiving FTP requests and providing FTP responses, and the location information is a URL associated with the FTP server.

In step S713, the location information received in step S712 is stored. The location information received in step S712 may be stored in any suitable memory or storage location. In some embodiments, the location information received in step S712 is stored in memory on the image processing device 100. For example, the location information received in step S712 may be stored in a cache, which may be located in an area of volatile memory. In some embodiments, the location information received in step S712 is stored in a database, a directory, or other suitable data store on the image processing device 100. In some embodiments, the location information received in step S712 is stored on the storage device 104 of the image processing device 100.

In some embodiments, one or more operations of step S504 may be performed based on or in accordance with default settings for the application 401. For example, one or more default settings for the application 401 may cause one or more operations of FIG. 7A to be performed for storing the encrypted electronic document in local storage. In some embodiments, one or more operations of step S504 may be performed based on or in accordance with preset settings for the application 401. For example, preset settings for the application 401 may cause one or more operations of FIG. 7B to be performed for storing the encrypted electronic document on a server computing system, such as the server computing system 420.

In some embodiments, one or more operations of step S504 may be performed based on or in accordance with one or more inputs indicating one or more user selections. For example, an administrator may provide one or more inputs via the hard key panel 119 and/or the touch sensitive display 117 of the image processing device 100 to specify settings for the application 401 to perform one or more operations of FIG. 7A or to perform one or more operations of FIG. 7B for storing the encrypted electronic document.

In some embodiments, step S504 includes determining a storage location and/or a storage mechanism to be used for storing the encrypted electronic document. For example, step S504 may include determining whether to perform operations described with reference to FIG. 7A for storing the encrypted electronic document, or whether to perform operations described with reference to FIG. 7B for storing the encrypted electronic document. In some embodiments, the application 401 executing on the image processing device 100 determines the storage location and/or the storage mechanism to be used for storing the encrypted electronic document based on setting information. For example, the image processing device 100 may check an indicator, table, or other data construct which indicates the presence or absence of an entry in a field corresponding to a configuration parameter. The configuration parameter may indicate a local storage location, a remote storage location, or a particular storage mechanism to be used for storing the encrypted electronic document. Once the storage location and/or the storage mechanism to be used for storing the encrypted electronic document has been determined, the application 401 executing on the image processing device 100 stores the encrypted electronic document in accordance with the determination.

In step S505, a message is generated at the image processing 100. In some embodiments, the message generated at step S505 includes location information for locating the encrypted electronic document stored in step S504. In some embodiments, the message generated at step S505 includes a key for decrypting the encrypted electronic document. In some embodiments, the message generated at step S505 includes restriction information indicating one or more restrictions associated with the encrypted electronic document. In some embodiments, the message generated at step S505 includes a combination of two or more of the location information for locating the encrypted electronic document, the key for decrypting the encrypted electronic document, and the restriction information indicating one or more restrictions associated with the encrypted electronic document. In some embodiments, one or more programs of the application 401 include instructions for generating the message.

The type of message generated at step S505 may vary. In some embodiments, a machine-readable code is generated as the message in step S505. In some embodiments, the message is generated at step S505 in accordance with NFC standards covering data exchange format and communication protocols. In some embodiments, the message is generated at step S505 in accordance with data format requirements associated with the notification service 431.

According to some embodiments, the application 401 executing on the image processing device 100 generates a machine-readable code as the message. Instructions for generating the machine-readable code may be stored in one or more memory locations on the image processing device 100. For example, the instructions may be included in an application program stored on the storage device 104. In some embodiments, the instructions, when executed by the processor(s) 101, cause the processor(s) 101 to generate a machine-readable code and present the machine-readable code on the display 117 of the image processing device 100. The machine-readable code may be any suitable barcode able to encode the information included in the message generated at step S505. By way of example and not by way of limitation, the machine-readable code may be a two-dimensional barcode, such as a QR code. In some embodiments, step S505 includes using a service to generate the machine-readable code.

According to some embodiments, the application 401 executing on the image processing device 100 generates the message to be output by way of near-field communication. For example, one or more programs of the application 401 may include instructions for generating the message using the NFC Data Exchange Format (NDEF). In some embodiments, the generated message is configured to be output from an NFC transceiver (for example, an NFC reader) connected to or included in the image processing device 100. In some embodiments, the application 401 executing on the image processing device 100 may prompt a user to bring a NFC-enabled device into close proximity with the NFC transceiver of the image processing device 100 to receive information output from the NFC transceiver of the image processing device 100. For example, textual information may be presented on the display 117 of the image processing device 100 to prompt the user.

According to some embodiments, the application 401 executing on the image processing device 100 generates the message to be delivered to a destination by the notification service 431. For example, one or more programs of the application 401 may include instructions for generating the message in accordance with a specified format for use in connection with the notification service 431. In some embodiments, the generated message is configured to be sent from the image processing device 100 to the notification service 431, and configured to be sent from the notification service 431 to the mobile computing device 200.

In some embodiments, step S505 includes determining the type of message to be generated in step S505. In some implementations, the type of message to be generated is determined based on default settings for the application 401. In some implementations, the type of message to be generated is determined based on a predetermined policy. In some implementations, the type of message to be generated is determined based on one or more inputs indicating one or more user selections.

In some embodiments, the type of message to be generated is determined based on default settings for the application 401. For example, a default setting for the application 401 may be to automatically generate the message as a machine-readable code. In some embodiments, the type of message to be generated is determined based on preset or default settings associated with the user logged in to the application 401. For example, a setting associated with the logged-in user may specify that messages are to be delivered via the notification service 431. The message would then be generated in accordance with a specified format for use in connection with the notification service 431.

In some embodiments, the type of message to be generated is determined based on or in accordance with a predetermined policy. For example, the type of message to be generated may be restricted depending upon whether one or more predefined criteria are or are not satisfied. The application 401 executing on the image processing device 100 may, for example, automatically generate the message as a machine-readable code for unregistered users. Further by way of example, the application 401 executing on the image processing device 100 may determine that a logged-in user satisfies a predefined criteria based on group membership information or access privileges associated with the user, which may enable alternative message types, such as NFC messages or messages sent via the notification service 431.

In some embodiments, the type of message to be generated is determined based on or in accordance with one or more inputs indicating one or more user selections. For example, the type of message generated may be based on custom settings selected by a user via the operation panel 106 of the image processing device 100. In some embodiments, the application 401 executing on the image processing device 100 presents one or more interface elements in a GUI on the display 117 of the image processing device 100. For example, one or more interface elements may be presented which enable a user to specify an output mode. A user may provide one or more inputs via the touch sensitive display 117 by touching an interface element to indicate a selection. The user may touch the display 117 with a finger, stylus, or other tool. Alternatively or additionally, one or more buttons on the hard key panel 119, a mouse, a keyboard, or other input device may be used to make a selection. For example, a user may position a cursor or other indicator over an interface element and then provide a user input to indicate a selection. Based on the user input indicating selection of the interface element, the user may specify an output mode for the message.

Figure 8:
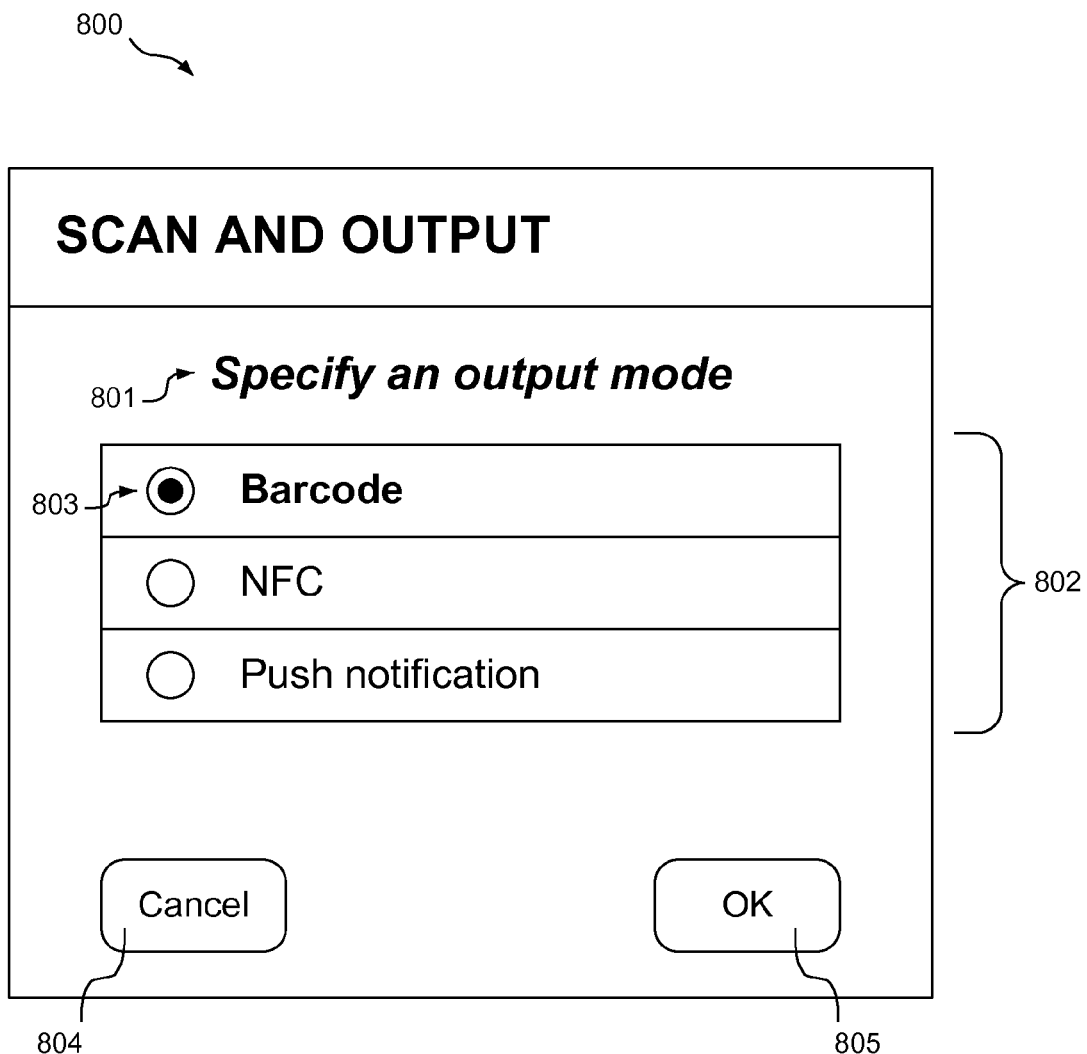
FIG. 8 illustrates an example graphical user interface on a display of an image processing device.

FIG. 8 illustrates an example GUI 800 on the display 117 of the image processing device 100. The example GUI 800 includes interface elements enabling a user to specify an output mode for the message. In some embodiments, the application 401 executing on the image processing device 100 presents the example GUI 800 on the display 117 of the image processing device 100. The example GUI 800 may be presented prior to receiving, in step S501, the request to perform the scan and output process. For example, the example GUI 800 may be presented to a user for selecting a custom setting for a scan and output process. Additionally or alternatively, the example GUI 800 may be presented to a user, such as an administrator, for selecting a setting to be stored as a configuration parameter associated with the application 401. In some embodiments, the example GUI 800 may be presented in response to receiving, in step S501, the request to perform the scan and output process. For example, the example GUI 800 may be presented to a user when a request to perform a scan and output process is received and an output mode has not been specified.

The example GUI 800 includes a prompt message 801, a list of output modes 802, a radio button associated with each output mode including a selected radio button 803, a Cancel button 804, and an OK button 805. The prompt message 801 is textual information to prompt a user to provide an input. The text of the prompt message 801 ("Specify an output mode") is a request for the user to select an output mode from the list of output modes 802. The list of output modes 802 includes textual information identifying the following three output modes: Barcode, NFC, and Push notification. The radio buttons associated with the respective output modes are interface elements enabling a user to specify an output mode by selecting the associated radio button and then the OK button 805. For example, in response to a user input indicating selection of the Barcode output mode, the application 401 executing on the image processing device 100 presents the selected radio button 803 including a dot or other indicator that designates the radio button associated with the Barcode output mode as a selected interface element, as shown in FIG. 8. A user may then select the OK button 805 by providing a user input to the OK button 805. Based on the user input indicating selection of the OK button 805, the Barcode output mode is specified as the output mode for the message generated in step S505 and output in step S506. The Cancel button 804 provides functionality to exit the "Specify an output mode" screen without updating the current setting for the output mode.

According to some embodiments, generating the message at step S505 includes retrieving information. The message generated at step S505 may include the retrieved information. In some embodiments, step S505 includes retrieving location information for locating the encrypted electronic document stored in step S504. For example, generating the message at step S505 may include retrieving the location information stored in step S703. Further by way of example, generating the message at step S505 may include retrieving the location information stored in step S713. In some embodiments, step S505 includes retrieving a key for decrypting the encrypted electronic document that was encrypted in step S503. For example, generating the message at step S505 may include retrieving the key stored in step S503. According to some embodiments, generating the message at step S505 includes retrieving one or both of the location information for locating the encrypted electronic document stored in step S504 and the key for decrypting the encrypted electronic document that was encrypted in step S503, and generating a message that includes one or both of the retrieved location information and the retrieved key.

According to some embodiments, generating the message at step S505 includes determining to include restriction information in the message, the restriction information indicating one or more restrictions associated with the encrypted electronic document. In some embodiments, step S505 includes generating the restriction information that is included in the message. The restriction information may include one or more instructions for execution by a computing system that receives the message generated at step S505. In some embodiments, the restriction information includes one or more instructions for execution by the mobile computing device 200.

The restriction information may include one or more instructions which when executed on a computing system cause the computing system to implement one or more security mechanisms. According to some embodiments, the one or more instructions, when executed, cause the computing system to perform one or more operations to restrict availability of at least one function or feature of the computing system in accordance with the restriction information. Examples of the one or more instructions which may be included in the restriction information include an instruction to update a configuration setting on a computing system, an instruction to enable or disable a service or feature of an application, and an instruction to restrict access to a resource on the computing system.

In some embodiments, the restriction information indicates a restriction associated with the encrypted electronic document. For example, the restriction information may indicate a restriction with respect to use of the encrypted electronic document and/or use of an unencrypted electronic document generated by decrypting the encrypted electronic document. Further by way of example, the restriction information may indicate a restriction regarding access to the encrypted electronic document and/or access to an unencrypted electronic document generated by decrypting the encrypted electronic document.

In some embodiments, the restriction information includes an instruction to prevent storage of an unencrypted electronic document generated by decrypting the encrypted electronic document. For example, the instruction may be an instruction to prevent: saving the document; copying the document; taking a screenshot while the unencrypted electronic document is being displayed; or other suitable restriction on storing the document.

In some embodiments, the restriction information includes an instruction to prevent transmission of one or both of the encrypted electronic document and an unencrypted electronic document generated by decrypting the encrypted electronic document. For example, the instruction may be an instruction to prevent transmission of the document: via electronic mail as an attachment; via short-range wireless transmission using NFC, Bluetooth, or other suitable protocol; via a public network to a data storage service or web application; or by another suitable transmission method.

In some embodiments, the restriction information includes an instruction to prevent one or more applications from accessing one or both of the encrypted electronic document and an unencrypted electronic document generated by decrypting the encrypted electronic document. For example, the instruction may be an instruction to prevent: adding the document to a shared database; adding a reference to the document to a public directory; broadcasting information pertaining to the document to applications on the computing system; or other suitable mechanism to prevent applications from accessing the document.

In some embodiments, the restriction information includes an instruction to prevent: printing the unencrypted electronic document; editing the unencrypted electronic document; viewing the unencrypted electronic document prior to user authentication; or other suitable restriction.

In some embodiments, step S505 includes determining the contents of the message to be generated in step S505. In some implementations, the information to be included in the message is determined based on default settings for the application 401. In some implementations, the information to be included in the message is determined based on a predetermined policy. In some implementations, information to be included in the message is determined based on one or more inputs indicating one or more user selections.

In some embodiments, the information to be included in the message is determined based on default settings for the application 401. For example, a default setting for the application 401 may be to automatically generate the message to include the location information for locating the encrypted electronic document and the key for decrypting the encrypted electronic document. In some embodiments, the contents of the message is determined based on preset or default settings associated with the user logged in to the application 401. For example, a setting associated with the logged-in user may specify that, in addition to the location information and the key, the message should also include restriction information indicating a restriction regarding use of the encrypted electronic document. The message would then be generated accordingly, so as to include the location information, the key, and the restriction information.

In some embodiments, the information to be included in the message is determined based on or in accordance with a predetermined policy. For example, the information to be included in the message may depend upon whether one or more predefined criteria are or are not satisfied. For example, for unregistered users, the application 401 executing on the image processing device 100 may automatically generate a message that includes restriction information indicating one or more restrictions associated with the encrypted electronic document. Further by way of example, the application 401 executing on the image processing device 100 may determine that a logged-in user satisfies a predefined criteria based on group membership information or access privileges associated with the user, which may enable the message to be generated with fewer restrictions associated with the encrypted electronic document or the message may be generated without including restriction information. In some embodiments, encryption of the electronic document triggers the automatic inclusion of restriction information indicating one or more restrictions associated with the encrypted electronic document. For example, encryption of the electronic document may have been performed in accordance with a predetermined policy or based on custom settings manually selected by a user for a scan and output process. In some embodiments, the application 401 executing on the image processing device 100 determines to include restriction information in the message generated in step S505 based on the electronic document being encrypted.

In some embodiments, the information to be included in the message is determined based on or in accordance with one or more inputs indicating one or more user selections. For example, the information to be included in the message may be based on custom settings selected by a user via the operation panel 106 of the image processing device 100. In some embodiments, the application 401 executing on the image processing device 100 presents one or more interface elements in a GUI on the display 117 of the image processing device 100. For example, one or more interface elements may be presented which enable a user to specify restriction information to include in the message. A user may provide one or more inputs via the touch sensitive display 117 by touching an interface element to indicate a selection. The user may touch the display 117 with a finger, stylus, or other tool. Alternatively or additionally, one or more buttons on the hard key panel 119, a mouse, a keyboard, or other input device may be used to make a selection. For example, a user may position a cursor or other indicator over an interface element and then provide a user input to indicate a selection. Based on the user input indicating selection of the interface element, the user may specify restriction information to include in the message.

Figure 9:
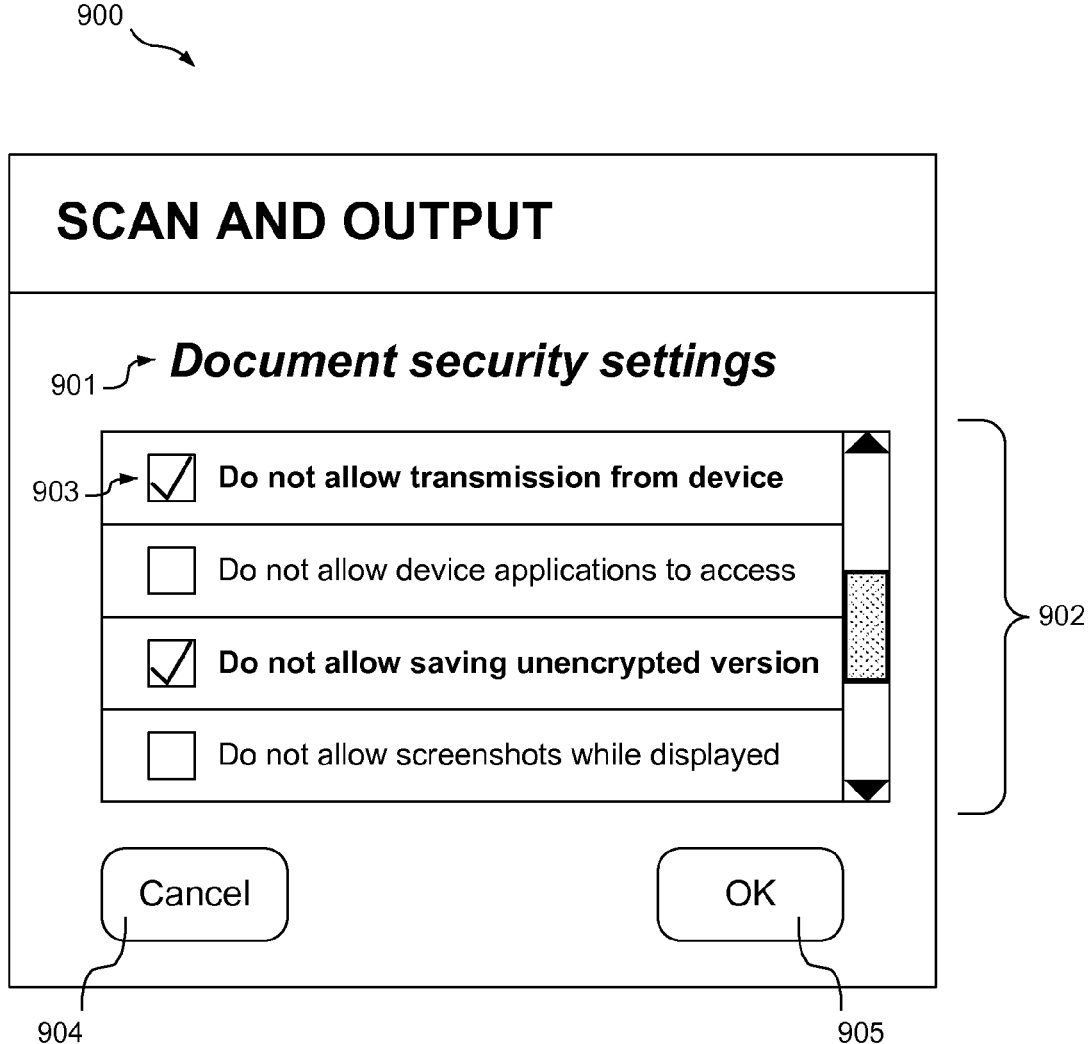
FIG. 9 illustrates an example graphical user interface on a display of an image processing device.

FIG. 9 illustrates an example GUI 900 on the display 117 of the image processing device 100. The example GUI 900 includes interface elements enabling a user to specify restriction information to include in the message. In some embodiments, the application 401 executing on the image processing device 100 presents the example GUI 900 on the display 117 of the image processing device 100. The example GUI 900 may be presented prior to receiving, in step S501, the request to perform the scan and output process. For example, the example GUI 900 may be presented to a user for selecting a custom setting for a scan and output process. Additionally or alternatively, the example GUI 900 may be presented to a user, such as an administrator, for selecting a setting to be stored as a configuration parameter associated with the application 401. In some embodiments, the example GUI 900 may be presented in response to receiving, in step S501, the request to perform the scan and output process. For example, when a request to perform a scan and output process is received, the example GUI 900 may be presented to query the user as to whether document security settings should be modified.

The example GUI 900 includes a prompt message 901, a list of document security settings 902, a check box associated with each document security setting including the selected check box 903, a Cancel button 904, and an OK button 905. The prompt message 901 is textual information to prompt a user to provide one or more inputs. The text of the prompt message 901 ("Document security settings")

indicates that the user selections will be associated with and/or apply to encrypted electronic documents generated by the scan and output process. The list of document security settings 902 includes textual information describing respective restrictions to be applied to scanned documents for each document security setting. The check boxes associated with the respective document security settings are interface elements enabling a user to specify a document security setting to apply by selecting the associated check box and then the OK button 905. For example, in response to a user input indicating selection of the "Do not allow transmission from device" setting, the application 401 executing on the image processing device 100 presents the selected check box 903 including a check mark or other indicator that designates the check box associated with the "Do not allow transmission from device" setting as a selected interface element, as shown in FIG. 9. A user may then select the OK button 905 by providing a user input to the OK button 905. Based on the user input indicating selection of the OK button 905, the "Do not allow transmission from device" setting is specified as one of the restrictions associated with the scanned document which will be indicated by the restriction information in the message generated in step S505 and output in step S506. The Cancel button 904 provides functionality to exit the "Document security settings" screen without updating the current document security settings.

In step S506, the message generated in step S505 is output. Thus, the type of message output in step S506 will correspond to the type of message generated in step S505. In some embodiments, a machine-readable code is output as the message in step S506. In some embodiments, the message is output at step S506 in accordance with NFC standards covering data exchange format and communication protocols. In some embodiments, the message is output at step S506 in accordance with data format requirements associated with the notification service 431. According to some embodiments, one or more programs of the application 401 include instructions for performing one or more of the operations of step S506.

Figure 10A:
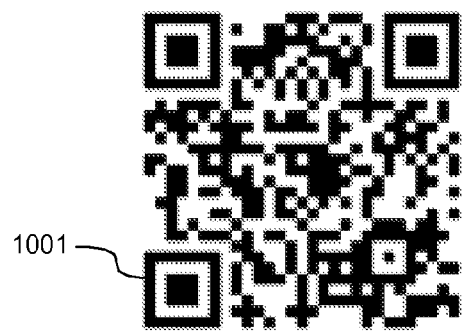
FIG. 10A illustrates an example machine-readable code presented on a display of an image processing device.
Figure 10B:
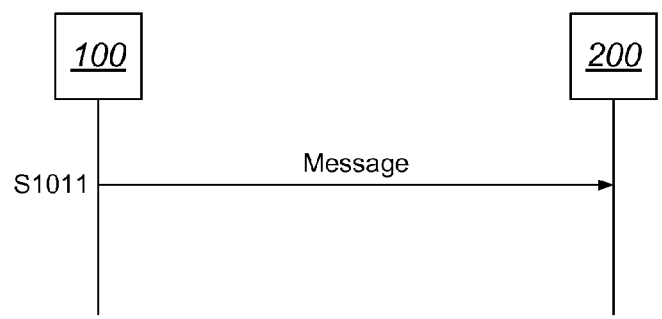
FIG. 10B illustrates an example operation within the example network environment of FIG. 4.
Figure 10C:
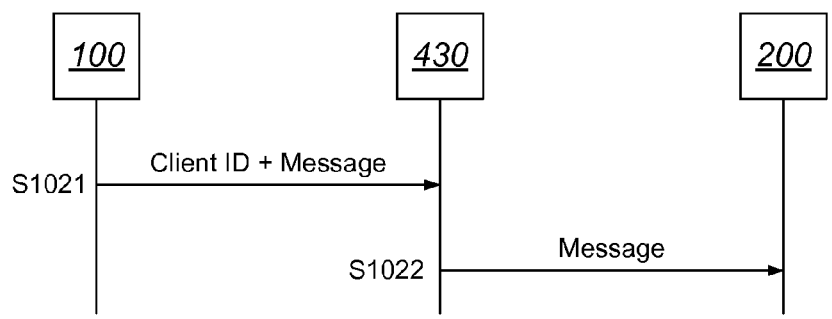
FIG. 10C illustrates example operations within the example network environment of FIG. 4.

Step S506 is described further with reference to FIG. 10A, FIG. 10B and FIG. 10C. The operations of FIG. 10A represent a first implementation of step S506. The operations of FIG. 10B represent a second implementation of step S506. And the operations of FIG. 10C represent a third implementation of step S506.

FIG. 10A illustrates an example machine-readable code 1001 presented on the display 117 of the image processing device 100. According to some embodiments, step S506 includes presenting on the display 117 of the image processing device 100 the machine-readable code generated in step S505. The machine-readable code may be any suitable barcode able to encode the information included in the message generated at step S505. By way of example and not by way of limitation, the machine-readable code may be a two-dimensional barcode, such as a QR code. For example, the machine-readable code generated in step S505, and output to the display 117 in step S506, may be a machine-readable code such as the machine-readable code 118 displayed on the display 117 of FIG. 1B.

Information encoded in the machine-readable code output in step S506 corresponds to the information included in the message generated at step S505. In some embodiments, the information encoded in the machine-readable code includes location information for locating the encrypted electronic document stored in step S504. In some embodiments, the information encoded in the machine-readable code includes a key for decrypting the encrypted electronic document. In some embodiments, the information encoded in the machine-readable code includes restriction information indicating one or more restrictions associated with the encrypted electronic document. In some embodiments, the information encoded in the machine-readable code includes a combination of two or more of the location information for locating the encrypted electronic document, the key for decrypting the encrypted electronic document, and the restriction information indicating one or more restrictions associated with the encrypted electronic document. The mobile computing device 200 may be configured to obtain the information encoded in the machine-readable code output in step S506. According to some embodiments, the mobile computing device 200 acquires an image of the machine-readable code and decodes the machine-readable code to obtain the information encoded in the machine-readable code.

FIG. 10B illustrates an example operation within the example network environment of FIG. 4. According to some embodiments, step S506 includes performing step S1011 of FIG. 10B. In step S1011, the message generated in step S505 on the image processing device 100 is wirelessly output. According to some embodiments, the mobile computing device 200 receives the message output in step S1011. The message may be sent using any suitable communication protocol.

In some embodiments, step S1011 includes outputting the message generated in step S505 by way of near-field communication. For example, the message may be output in accordance with NFC standards covering data exchange format and communication protocols. In some embodiments, the message is output from an NFC transceiver (for example, an NFC reader) connected to or included in the image processing device 100. In some embodiments, the application 401 executing on the image processing device 100 may prompt a user to bring a NFC-enabled device into close proximity with the NFC transceiver of the image processing device 100 to receive information output from the NFC transceiver of the image processing device 100. For example, textual information may be presented on the display 117 of the image processing device 100 to prompt the user. According to some embodiments, the mobile computing device 200 is a NFC-enabled device that receives the message output in step S1011 by way of near-field communication.

According to some embodiments, the message output in step S1011 is a NFC Data Exchange Format (NDEF) message. The payload of the NDEF message includes the location information for locating the encrypted electronic document stored in step S504, the key for decrypting the encrypted electronic document, the restriction information indicating one or more restrictions associated with the encrypted electronic document, or a combination of two or more of the location information, the key, and the restriction information.

FIG. 10C illustrates example operations within the example network environment of FIG. 4. According to some embodiments, step S506 includes performing step S1021 of FIG. 10C. In step S1021, information is sent from the image processing device 100 to the server computing system 430 having the notification service 431. The information sent in step S1021 includes the message generated in step S505, an identifier that identifies the mobile computing device 200 or that identifies the application 402 on the mobile computing device 200, and a request to send the message to the destination that is associated with the identifier.

In step S1022, the notification service 431 executing on the server computing system 430 sends the message the image processing device 100 sent in step S1021 to the mobile computing device 200 based on the identifier that identifies the mobile computing device 200 or the application 402 on the mobile computing device 200. In some embodiments, the notification service 431 may require that one or both of the image processing device 100 and the mobile computing device 200 is/are already registered with the server computing system 430 in order for the notification service 431 to provide the services described with reference to FIG. 10C. For example, the notification service 431 may require registration for devices requesting that the notification service 431 forward messages. Additionally, the notification service 431 may require registration for devices receiving forwarded messages from the notification service 431.

This disclosure contemplates any suitable registration process to register a device to use the notification service 431. For example, registering the image processing device 100 and the mobile computing device 200 to use the notification service 431 may require one or more of the following: establishing a relationship between the image processing device 100 and the notification service 431; establishing a relationship between the mobile computing device 200 and the notification service 431; and establishing a relationship between the image processing device 100 and the mobile computing device 200. One or more of the image processing device 100, the mobile computing device 200, and the notification service 431 may also be required to generate, share, or store various data including credentials, tokens, cryptographic keys, or other suitable information to carry out various operations. For example, the data may be used by the respective devices to identify, authenticate, and securely communicate with each other.

By way of example, the identifier sent in step S1021 may be data which was generated, shared, and/or stored by the respective devices during a registration process. The identifier uniquely identifies the mobile computing device 200 or the application 402 on the mobile computing device 200. In some embodiments, the notification service 431 generates the identifier. In some embodiments, the identifier is encrypted. In some embodiments, the notification service 431 provides the identifier to the mobile computing device 200. In some embodiments, the mobile computing device 200 shares the identifier with the image processing device 100. In some embodiments, the image processing device 100 associates the identifier a user account. In some embodiments, the application 401 executing on the image processing device 100 only permits use of the notification service 431 for logged-in users.

The message sent in step S1021 is a message in accordance with a specified format for use in connection with the notification service 431. The payload of the message sent in step S1021 includes the location information for locating the encrypted electronic document stored in step S504, the key for decrypting the encrypted electronic document, the restriction information indicating one or more restrictions associated with the encrypted electronic document, or a combination of two or more of the location information, the key, and the restriction information.

Additionally, the message sent in step S1022 is a message in accordance with a specified format for use in connection with the notification service 431. The payload of the message sent in step S1022 includes the location information for locating the encrypted electronic document stored in step S504, the key for decrypting the encrypted electronic document, the restriction information indicating one or more restrictions associated with the encrypted electronic document, or a combination of two or more of the location information, the key, and the restriction information.

Figure 11:
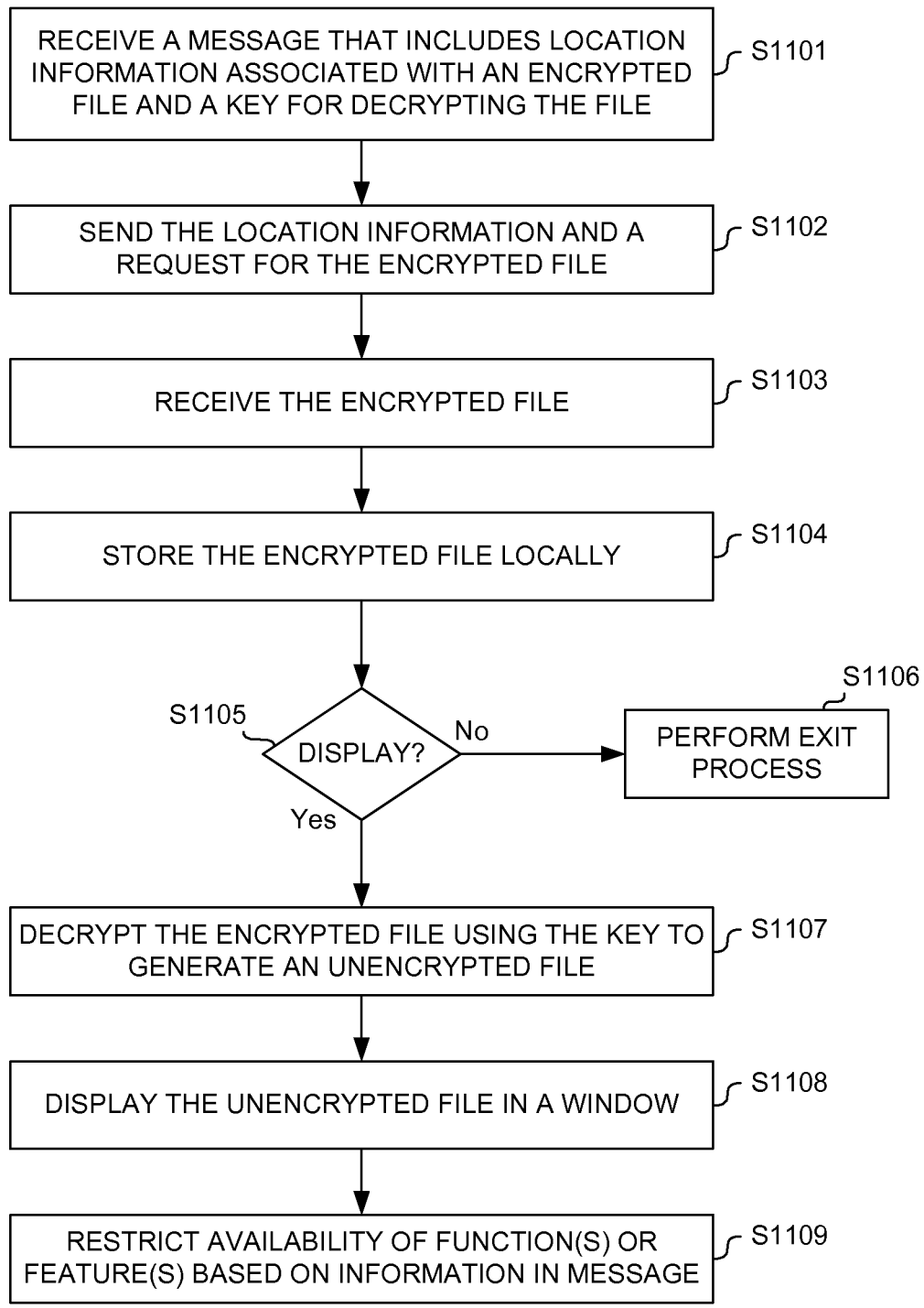
FIG. 11 illustrates an example flow of operations at a mobile computing device.

FIG. 11 is described with reference to the example network environment 400 of FIG. 4. FIG. 11 illustrates an example flow of operations at the mobile computing device 200. One or more of the steps of FIG. 11 may be performed based on or in accordance with default settings for the application 402, a predetermined policy, one or more inputs indicating one or more user selections, or a combination of two or more of these.

In step S1101, a message is received at the mobile computing device 200. In some embodiments, the message received at step S1101 includes location information associated with an encrypted electronic document. In some embodiments, the message received at step S1101 includes a key for decrypting the encrypted electronic document. In some embodiments, the message received at step S1101 includes restriction information indicating one or more restrictions associated with the encrypted electronic document. In some embodiments, the message received at step S1101 includes a combination of two or more of the location information associated with the encrypted electronic document, the key for decrypting the encrypted electronic document, and the restriction information indicating one or more restrictions associated with the encrypted electronic document.

According to some embodiments, the message received in step S1101 is the message output in step S506. In some embodiments, the location information included in the message received in step S1101 is the location information for locating the encrypted electronic document stored in step S504. In some embodiments, the key included in the message received in step S1101 is the key for decrypting the encrypted electronic document that was encrypted in step S503. In some embodiments, the restriction information included in the message received in step S1101 is the restriction included in the message generated at step S505.

In step S1101, the mobile computing device 200 may perform operations in accordance with the type of message received by the mobile computing device 200. In some embodiments, step S1101 includes receiving the message by reading and decoding a machine-readable code. In some embodiments, step S1101 includes receiving the message by way of near-field communication. In some embodiments, step S1101 includes receiving a message in accordance with data format requirements associated with a notification service 431. According to some embodiments, one or more programs of the application 402 include instructions for performing one or more of the operations of step S1101.

According to some embodiments, receiving the message at the mobile computing device 200 in step S1101 includes reading and decoding a machine-readable code presented on the display 117 of the image processing device 100. For example, in some embodiments, outputting the message in step S506 includes presenting the machine-readable code 1001 on the display 117 of the image processing device 100, as described with reference to FIG. 10A. While the machine-readable code is presented on the display 117 of the image processing device 100, the mobile computing device 200 may read the machine-readable code in response to a user input. For example, the mobile computing device 200 may perform a reading operation in response to the user pressing a hard button on the mobile computing device 200 or a graphical object displayed on a GUI of the mobile computing device 200.

In some embodiments, the mobile computing device 200 reads the machine-readable code with a reading unit. The reading unit may be a reading unit such as the reading unit 301 described above with respect to FIG. 3A. The reading unit may include, for example, a camera for acquiring an image and may additionally include image processing circuitry for processing an acquired image. The reading unit uses an image sensor to detect an image and generate electrical signals. Electrical signals are converted to digital image data representing the machine-readable code. The digital image data may then undergo image processing. In some embodiments, the digital image data is also stored in the memory 202 and/or the storage 203 of the mobile computing device 200.

After reading the machine-readable code, the mobile computing device 200 obtains information encoded in the machine-readable code by decoding the machine-readable code. Instructions for decoding the machine-readable code may be stored in the memory 202 and/or the storage 203 of the mobile computing device 200 and may be executed by the processor(s) 201. By way of example, the information encoded on the machine-readable code may include one or more of the location information associated with the encrypted electronic document, the key for decrypting the encrypted electronic document, and the restriction information indicating one or more restrictions associated with the encrypted electronic document.

According to some embodiments, receiving the message at the mobile computing device 200 in step S1101 includes receiving a message by way of near-field communication. For example, in some embodiments, the message generated in step S505 is output in accordance with NFC standards covering data exchange format and communication protocols, as described with reference to step S1011 of FIG. 10B. The message generated in step S505 may, for example, be output from an NFC transceiver connected to or included in the image processing device 100. Moreover, in some embodiments, the mobile computing device 200 is an NFC-enabled mobile computing device having an NFC transceiver, such as the NFC device 306 located within the enclosure of the mobile computing device 300, operable to receive a message output from the NFC transceiver of the image processing device 100.

In some embodiments, the application 401 executing on the image processing device 100 may prompt a user to bring a NFC-enabled device into close proximity with the NFC transceiver of the image processing device 100 to receive information output from the NFC transceiver of the image processing device 100. For example, textual information may be presented on the display 117 of the image processing device 100 to prompt the user. When the NFC-enabled mobile computing device 200 is within a range allowing for NFC communication, the mobile computing device 200 receives the message by way of near-field communication.

In some embodiments, the message output in step S1011 of FIG. 10B is the message the mobile computing device 200 receives in step S1101 of FIG. 11. According to some embodiments, the message received in step S1101 is a NDEF message and the payload of the NDEF message includes one or more of the location information associated with the encrypted electronic document, the key for decrypting the encrypted electronic document, and the restriction information indicating one or more restrictions associated with the encrypted electronic document.

According to some embodiments, receiving the message at the mobile computing device 200 in step S1101 includes receiving a message in accordance with data format requirements associated with the notification service 431. For example, in some embodiments, the image processing device 100 sends the message generated in step S505 to the notification service 431 with a request to send the message to the mobile computing device 200, as described with reference to step S1021 of FIG. 10C. In response to the request, the notification service 431 sends the message to the mobile computing device 200 in step S1022 of FIG. 10C.

In some embodiments, the message sent in step S1022 of FIG. 10C is the message the mobile computing device 200 receives in step S1101 of FIG. 11. The message sent in step S1022 is a message in accordance with a specified format for use in connection with the notification service 431, and the payload of the message includes one or more of the location information associated with the encrypted electronic document, the key for decrypting the encrypted electronic document, and the restriction information indicating one or more restrictions associated with the encrypted electronic document.

In step S1102, the mobile computing device 200 sends the location information obtained in step S1101 and a request for the encrypted electronic document associated with the location information. In some embodiments, the location information is the information for locating the encrypted electronic document stored in step S504. In some embodiments, in step S1102, the application 402 executing on the mobile computing device 200 sends a request to access the resource referenced by the location information. The location information may be a URL of the encrypted electronic document stored in step S504.

Figure 12:
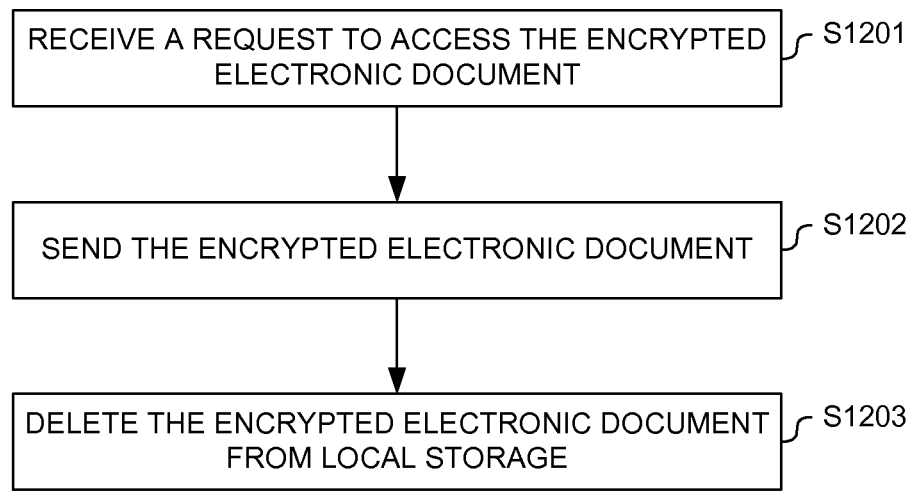
FIG. 12 illustrates an example flow of operations at an image processing device.

According to some embodiments, in step S1102 the mobile computing device 200 sends the location information and the request for the encrypted electronic document to the image processing device 100. For example, in some embodiments, the message received by the mobile computing device 200 in step S1101 is a message that includes the location information generated in step S702 of FIG. 7A. The location information generated in step S702 is information for locating the encrypted electronic document stored on the image processing device 100 in step S701. Accordingly, in some embodiments, the message that is output in step S506 is a message that includes the location information generated in step S702. When the mobile computing device 200 receives that message in step S1101, the mobile computing device 200 obtains the location information that was generated in step S702. Then in step S1102, the mobile computing device 200 sends to the image processing device 100 that location information and a request for the resource referenced by the location information, which is the encrypted electronic document stored on the image processing device 100 in step S701. FIG. 12 describes operations at the image processing device 100 upon receiving the request which the mobile computing device 200 sent in step S1102.

FIG. 12 illustrates an example flow of operations at the image processing device 100. In step S1201, the image processing device 100 receives from the mobile computing device 200 a request to access an encrypted electronic document. In some embodiments, the request received in step S1201 is a request to access the encrypted electronic document that was generated in step S503 and stored on the image processing device 100 in step S701.

In step S1202, in response to the request received in step S1201, the image processing device 100 sends to the mobile computing device 200 the encrypted electronic document that was stored on the image processing device 100 in step S701. In some embodiments, step S1202 includes using the location information that was generated in step S702 and stored in step S703 to identify or retrieve the encrypted electronic document stored on the image processing device 100. For example, the image processing device 100 may have compared information received from the mobile computing device 200 in step S1201 with the location information that was stored in step S703 in order to identify or retrieve the encrypted electronic document. The image processing device 100 then sends to the mobile computing device 200 the requested encrypted electronic document.

In step S1203, the encrypted electronic document is deleted from the image processing device 100. For example, in step S701, the encrypted electronic document was stored somewhere on the image processing device 100 such as in a file system, a database, a document management system, or other suitable data store on the image processing device 100. In step S1203, the image processing device 100 deletes the encrypted electronic document from wherever it was being stored on the image processing device 100. In some embodiments, other information on the image processing device 100 associated with the encrypted electronic document is also deleted from storage or cleared from memory. For example, in some embodiments, step S1203 includes erasing the location information that was stored in step S703.

Referring again to step S1102, in some embodiments the mobile computing device 200 sends the location information and the request to a computing system different from the image processing device 100. According to some embodiments, in step S1102 the mobile computing device 200 sends the location information and the request for the encrypted electronic document to the server computing system 420. For example, in some embodiments, the message received by the mobile computing device 200 in step S1101 is a message that includes the location information received in step S712 of FIG. 7B. The location information received in step S712 is information for locating the encrypted electronic document that was stored at the server computing system 420 in response to the request the image processing device 100 sent in step S711. Accordingly, in some embodiments, the message that is output in step S506 is a message that includes the location information received in step S712. When the mobile computing device 200 receives that message in step S1101, the mobile computing device 200 obtains the location information that was received in step S712. Then in step S1102, the mobile computing device 200 sends to the server computing system 420 that location information and a request for the resource referenced by the location information, which is the encrypted electronic document stored at the server computing system 420.

In step S1103, the mobile computing device 200 receives the encrypted electronic document associated with the location information obtained in step S1101. In some embodiments, the encrypted electronic document received in step S1103 was sent to the mobile computing device 200 in response to the request the mobile computing device 200 sent in step S1102. In some embodiments, in step S1103 the mobile computing device 200 receives the encrypted electronic document sent from the image processing device 100 in step S1202. In some embodiments, in step S1103 the mobile computing device 200 receives the encrypted electronic document from the server computing system 420. For example, in some embodiments, in response to the request the mobile computing device 200 sent to the server computing system 420 in step S1102, the server computing system 420 sends the encrypted electronic document to the mobile computing device 200.

According to some embodiments, in step S1103 the mobile computing device 200 receives the encrypted electronic document that was stored in step S504. For example, the message generated in step S505 may include location information for locating the encrypted electronic document stored in step S504. The message including the location information is output in step S506 and the mobile computing device 200 receives the message in step S1101. Upon receiving the message, the mobile computing device 200 obtains the location information and uses the location information in step S1102 to request access to the encrypted electronic document. The location information may be, for example, a URL of the encrypted electronic document that was stored in step S504. The location information may be a reference to the encrypted electronic document, or may specify a location the encrypted electronic document is stored, or otherwise identify the encrypted electronic document that was stored in step S504. Accordingly, at step S1103, the mobile computing device 200 may receive the encrypted electronic document that was stored in step S504, based on the location information included in the message received in step S1101.

In step S1104, the encrypted electronic document received in step S1103 is stored on the mobile computing device 200. Other data associated with the encrypted electronic document may also be stored. For example, in some embodiments, the message received at step S1101 includes a key for decrypting the encrypted electronic document. The key received in step S1101 for decrypting the encrypted electronic document may be stored in association with the encrypted electronic document. Further by way of example, in some embodiments, the message received at step S1101 includes restriction information indicating one or more restrictions associated with the encrypted electronic document. Any restriction information received in step S1101 may be stored in association with the encrypted electronic document.

In some embodiments, step S1104 includes encrypting the encrypted electronic document again when the file is stored on the mobile computing device 200. Any suitable encryption key may be used to encrypt the encrypted electronic document again. For example, an encryption key associated with the operating system of the mobile computing device 200 may be used as the encryption key, a credential such as the master password that protects the mobile computing device 200 may be used as the encryption key, or another suitable key may be used. In addition to encrypting the encrypted electronic document received in step S1103, the key received in step S1101 for decrypting the encrypted electronic document may also be encrypted again when the file is stored on the mobile computing device 200. Encryption of the key received in step S1101 may be performed in the same manner that the encrypted electronic document is encrypted again, for example, using a key associated with the operating system of the mobile computing device 200, or the master password as a key.

In step S1104, the encrypted electronic document may be stored in the memory 202 and/or the storage 203 of the mobile computing device 200. In some embodiments, the encrypted electronic document is stored in a container associated with the application 402 on the mobile computing device 200. In some embodiments, the encrypted electronic document is stored without broadcasting information pertaining to the document to applications on the computing system. In some embodiments, the encrypted electronic document is stored in a container that cannot be accessed by one or more other applications on the mobile computing device 200.

In step S1105, the application 402 executing on the mobile computing device 200 determines whether to display the document received in step S1103. In some embodiments, step S1105 includes determining whether to display the document received in step S1103 based on default settings for the application 402. In some embodiments, step S1105 includes determining whether to display the document received in step S1103 based on a predetermined policy. In some embodiments, step S1105 includes determining whether to display the document received in step S1103 based on one or more inputs indicating one or more user selections.

In some embodiments, determining whether to display the document received in step S1103 is based on default settings for the application 402. For example, a default setting for the application 402 may be to automatically display the document received in step S1103. In some embodiments, determining whether to display the document received in step S1103 is based on preset or default settings associated with the user logged in to the application 402 on the mobile computing device 200. For example, a setting associated with the logged-in user may specify that newly received scanned documents are not to be displayed automatically. Instead a newly scanned document would be added to a file list associated with the application 402 and the scanned document could be displayed by the user accessing the file list in the application 402 and manually selecting to view the file.

In some embodiments, determining whether to display the document received in step S1103 is based on or in accordance with a predetermined policy. For example, automatically displaying the document received in step S1103 may be restricted depending upon whether one or more predefined criteria are or are not satisfied. The application 402 executing on the mobile computing device 200 may, for example, determine that a logged-in user satisfies a predefined criteria based on group membership information or access privileges associated with the user, which may enable automatically displaying the document received in step S1103.

In some embodiments, determining whether to display the document received in step S1103 is based on or in accordance with one or more inputs indicating one or more user selections. For example, whether to display the document received in step S1103 may be based on a selection by a user via the I/O interface 204 of the mobile computing device 200. In some embodiments, the mobile computing device 200 includes a display having a touch sensitive element, such as the display 302 of the mobile computing device 300, operable to receive user inputs or commands based on the touching of interface elements presented in a GUI on the display. In some embodiments, the application 402 executing on the mobile computing device 200 presents one or more interface elements in a GUI on the display of the mobile computing device 200. For example, one or more interface elements may be presented in connection with a query. A user may provide one or more inputs via the touch sensitive display by touching an interface element to indicate a selection. The user may touch the display with a finger, stylus, or other tool. Based on the user input indicating selection of the interface element, the user may specify whether to display the document.

Figure 13:
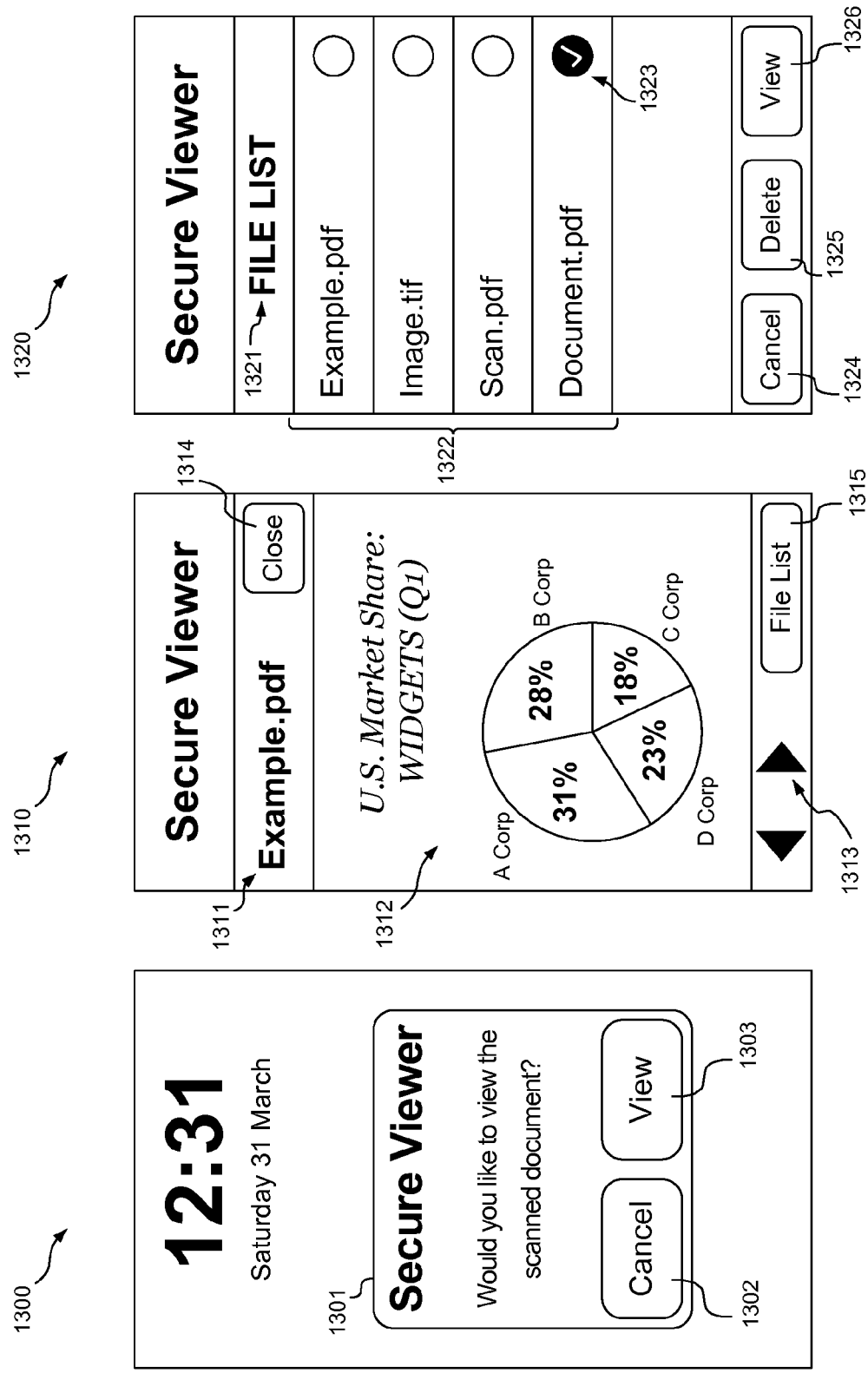
FIG. 13A illustrates an example graphical user interface on a display of a mobile computing device.
FIG. 13B illustrates an example graphical user interface on a display of a mobile computing device.
FIG. 13C illustrates an example graphical user interface on a display of a mobile computing device.

FIG. 13A illustrates an example GUI 1300 on the display of the mobile computing device 200. The example GUI 1300 includes interface elements enabling a user to specify whether to display the document. In some embodiments, the application 402 executing on the mobile computing device 200 presents the example GUI 1300 on the display of the mobile computing device 200. The example GUI 1300 may be presented in response to receiving a newly scanned document as an encrypted electronic document in step S1103.

The example GUI 1300 includes a prompt window 1301, a Cancel button 1302, and a View button 1303. The prompt window 1301 includes textual information to query a user and prompt the user to provide an input. The text of the query ("Would you like to view the scanned document?") prompts the user to specify whether to display the document. A user may select the View button 1303 by providing a user input to the View button 1303. Based on the user input indicating selection of the View button 1303, the application 402 executing on the mobile computing device 200 will display the document. The Cancel button 1302 provides functionality to close the prompt window 1301 without displaying the newly scanned document.

In step S1105, in response to determining to display the document received in step S1103 (Yes in step S1105), the process advances to step S1107. On the other hand, in response to determining not to display the document received in step S1103 (No in step S1105), the process advances to step S1106.

In step S1106, the newly received scanned document is not displayed and the document is added to a file list associated with the application 402. The scanned document can be displayed by a user accessing the file list in the application 402 and manually selecting to view the file.

In step S1107, the encrypted electronic document stored in step S1104 is decrypted using the key included in the message received in step S1101. In some embodiments, the key is a symmetric key that was used for encrypting the electronic document in step S503. In some embodiments, the location information for locating the encrypted electronic document and the key for decrypting the encrypted electronic document are both included in the message received in step S1101. In some embodiments, after the key is received in step S1101 the key is stored on the mobile computing device 200 and, in response to determining to display the document the key is retrieved for performing a decryption operation.

In step S1107, the encrypted electronic document stored in step S1104 is decrypted using the key to generate an unencrypted electronic document. By the decryption operation a file is generated, namely, the unencrypted electronic document, and the encrypted electronic document is unchanged and remains stored on the mobile computing device 200. In some embodiments, the application 402 executing on the mobile computing device 200 decrypts the encrypted electronic document using the key to generate an unencrypted electronic document.

In step S1108, an image of the unencrypted electronic document generated in step S1107 is presented on the display of the mobile computing device 200. In some embodiments, the application 402 executing on the mobile computing device 200 presents the image of the unencrypted electronic document on the display of the mobile computing device 200.

Step S1108 is described further with reference to FIG. 13B. FIG. 13B illustrates an example GUI 1310 on the display of the mobile computing device 200. The example GUI 1310 includes an image of the unencrypted electronic document 1312 presented on the display. The example GUI 1310 also includes additional information and interface elements enabling a user to navigate the screen presented on the display. In some embodiments, the application 402 executing on the mobile computing device 200 presents the example GUI 1310 on the display of the mobile computing device 200. In some embodiments, the example GUI 1310 is presented automatically in response to receiving a newly scanned document in step S1103. In some embodiments, the example GUI 1310 is presented based on a user input indicating a selection to view the file.

The example GUI 1310 includes a File Information bar 1311, the image of the unencrypted electronic document 1312, Back and Forward buttons 1313, a Close button 1314, and a File List button 1315. The File Information bar 1311 includes textual information that identifies the file currently presented on the display. The text indicates the file name ("Example.pdf") of the document that is displayed. The image of the unencrypted electronic document 1312 is presented on the display. The Back and Forward buttons 1313 provide functionality to navigate backward and forward between files presented on the display based on user inputs to the respective buttons. The Close button 1314 within the File Information bar 1311 provides functionality to close the window in which the image of the unencrypted electronic document 1312 is currently presented. The File List button 1315 provides functionality to present the user's File List on the display.

In step S1109, the application 402 executing on the mobile computing device 200 restricts availability of at least one function or feature of the mobile computing device 200 based on information included in the message received in step S1101. For example, in some embodiments, restrictions may be applied based on one or more of the following in the message: the location information, the key for decrypting the encrypted document, or the restriction information indicating one or more restrictions associated with the encrypted electronic document.

According to some embodiments, step S1109 includes restricting the availability of at least one function or feature of the mobile computing device 200 based on the location information in the message received in step S1101. The location information may be a URL, a path specifying a location in a file system, a file name, or other information for locating the encrypted electronic document. In some embodiments, the application 402 executing on the mobile computing device 200 may determine to implement one or more security mechanisms based on the location information received in step S1101. For example, the location information may fail to satisfy one or more predefined criteria causing one or more additional security features to be implemented in accordance with a predetermined policy. By way of example, the location information may specify an untrusted file system or domain such that a security mechanism is automatically implemented such as a restricted sandbox feature to limit access to the file.

According to some embodiments, step S1109 includes restricting the availability of at least one function or feature of the mobile computing device 200 based on the inclusion of the key for decrypting the encrypted electronic document in the message received in step S1101. In some embodiments, the presence of the encryption key may trigger the automatic inclusion of one or more security mechanisms based on a predetermined policy. One or more restrictions may be automatically implemented regarding, for example, the storage and/or use of the unencrypted electronic document that is generated when the key is used to decrypt the encrypted electronic document.

In some embodiments, step S1109 includes restricting the availability of at least one function or feature of the mobile computing device 200 based on restriction information included in the message received in step S1101. The restriction information received in step S1101 is the restriction information included in the message generated in step S505. According to some embodiments, the restriction information includes one or more instructions which, when executed, cause the mobile computing device 200 to perform one or more operations to restrict availability of at least one function or feature of the mobile computing device 200 in accordance with the restriction information, as described with reference to FIG. 5. In some embodiments, the restriction information indicates a restriction associated with the encrypted electronic document.

In step S1109, the mobile computing device 200 may restrict the availability of various functions or features based on restriction information associated with an encrypted electronic document. For example, the restriction information received in step S1101 may indicate a restriction with respect to use of the encrypted electronic document received in step S1103 or use of the unencrypted electronic document generated by decrypting the encrypted electronic document in step S1107. Further by way of example, the restriction information received in step S1101 may indicate a restriction regarding access to the encrypted electronic document received in step S1103 or access to an unencrypted electronic document generated by decrypting the encrypted electronic document in step S1107.

Referring to FIG. 13B, the unencrypted electronic document 1312 displayed in FIG. 13B represents a scanned physical document on which a scan and output process was executed at the image processing device 100. The message output in step S506 of that scan and output process included location information for locating the encrypted electronic document, a key for decrypting the encrypted electronic document, and restriction information indicating a restriction associated with the encrypted electronic document. The mobile computing device 200 received the message in step S1101 and used the location information to obtain the encrypted electronic document. The encrypted electronic document was decrypted using the key to generate the unencrypted electronic document 1312 and the image of the unencrypted electronic document 1312 is presented in a window on the display of the mobile computing device 200 in FIG. 13B. The file name associated with the unencrypted electronic document 1312 displayed in FIG. 13B is "Example.pdf" as indicated by the File Information bar 1311.

According to some embodiments, the restriction information associated with file "Example.pdf" includes an instruction to prevent storage of an unencrypted electronic document generated by decrypting the encrypted electronic document. The instruction may include instruction(s) to prevent saving and/or copying of the unencrypted electronic document. By way of example, the following restriction information indicated at FIG. 9 may be implemented in step S1109: "Do not allow saving unencrypted version."

Based on the restriction information included in the message, the application 402 executing on the mobile computing device 200 restricts the availability of at least one function or feature of the mobile computing device 200. For example, security mechanisms such as disabling a "Save" function or "Copy" function of the application 402 may be implemented based on the restriction information. Further by way of example, one or more operations may be performed to prevent storage of an unencrypted electronic document generated by decrypting the encrypted electronic document using the key.

For example, referring to FIG. 13B, the image of the unencrypted electronic document 1312 is presented in a window on the display of the mobile computing device 200. The unencrypted electronic document 1312 was generated in step S1107 by decrypting the encrypted electronic document stored in step S1104 using the key received in step S1101. Accordingly, when the unencrypted electronic document 1312 is displayed on the mobile computing device 200 in FIG. 13B, at least the following two files are on the mobile computing device 200: (1) the unencrypted electronic document 1312 which was generated in step S1107 by decrypting the encrypted electronic document stored in step S1104; and (2) the encrypted electronic document stored in step S1104. Thus, based on the restriction information, a mechanism such as shown at FIG. 14 may be implemented to ensure that the unencrypted file does not persist in memory or storage.

Figure 14:
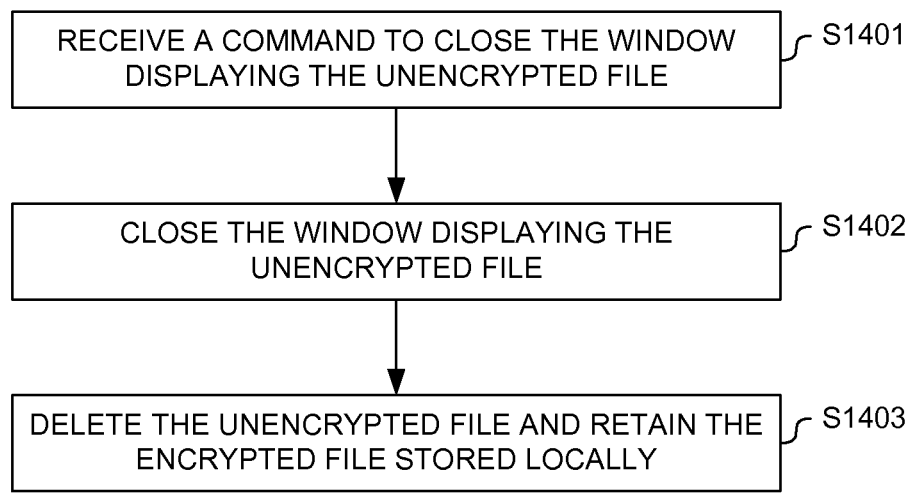
FIG. 14 illustrates an example flow of operations at a mobile computing device.

FIG. 14 illustrates an example flow of operations at the mobile computing device 200. In step S1401, a command is received to close the window displaying the unencrypted file. For example, referring to FIG. 13B, a user may provide an input by touching the Close button 1314 within the File Information bar 1311 in order to close the window in which the image of the unencrypted electronic document 1312 is presented. Alternatively, a user may provide an input by touching the File List button 1315 in order to view the user's File List, thus causing the window in which the image of the unencrypted electronic document 1312 is presented to close.

In step S1402, the window displaying the unencrypted electronic document 1312 is closed based on the command received in step S1401. Upon closing the window in step S1402, although the image of the unencrypted electronic document 1312 is no longer presented on the display, the unencrypted electronic document 1312 is still a file on the mobile computing device 200.

In step S1403, the unencrypted electronic document 1312 is deleted from the memory 202 and/or the storage 203 of the mobile computing device 200. On the other hand, the encrypted electronic document and the key that were used to generate the unencrypted electronic document 1312 remain stored on the mobile computing device 200. That is, both the encrypted electronic document stored in step S1104 and the key for decrypting the encrypted electronic document stored in step S1104 remain stored. Thus, in step S1403, the unencrypted electronic document 1312 associated with the file name "Example.pdf" is deleted; however, the encrypted electronic document associated with the file name "Example.pdf" is not deleted. Accordingly, the encrypted electronic document associated with the file name "Example.pdf" remains stored on the mobile computing device 200, as indicated by the File List shown in FIG. 13C.

FIG. 13C illustrates an example GUI 1320 on the display of the mobile computing device 200. According to some embodiments, while the example GUI 1310 of FIG. 13B is presented, a user provides an input indicating selection of the File List button 1315. For example, the input may be the input provided in step S1401 by touching the File List button 1315. In response to the selection of the File List button 1315, the example GUI 1320 of FIG. 13C is presented on the display of the mobile computing device 200.

The example GUI 1320 illustrates a user's File List presented on the display. The example GUI 1320 also includes additional information and interface elements enabling a user to navigate the screen presented on the display. In some embodiments, the application 402 executing on the mobile computing device 200 presents the example GUI 1320 on the display of the mobile computing device 200.

The example GUI 1320 includes a File List Information bar 1321, a list of files 1322, an indicator button associated with each file including a selected indicator button 1323, a Cancel button 1324, a Delete button 1325, and a View button 1326. The File List Information bar 1321 includes textual information that identifies the current screen presented on the display. The text indicates a category of items ("FILE LIST") presented on the display. The list of files 1322 includes respective graphical elements having textual information identifying the file name for each file included in the list of files 1322. Each graphical element may represent a respective file stored on the mobile computing device 200. The indicator buttons associated with the respective files are interface elements enabling a user to specify a file by selecting the associated indicator button. For example, in response to a user input indicating selection of the indicator button associated with the file having "Document.pdf" as a file name, the selected indicator button 1323 is presented. The selected indicator button 1323 includes a check mark over a filled-in circle to designate the indicator button associated with the "Document.pdf" file as a selected interface element. Therefore, a user's selection of the Delete button 1325 or the View button 1326 on the example GUI 1320 would initiate one or more operations with respect to the file associated with the file name "Document.pdf". The Cancel button 1324 provides functionality to exit the "FILE LIST" screen without modifying the user's File List or the respective files represented by the graphical elements in the list of files 1322.

Referring to the example GUI 1320 of FIG. 13C, according to some embodiments, the graphical element identifying the file name "Example.pdf" is a graphical element representing the encrypted electronic document that was stored in step S1104, and that remained stored when the unencrypted electronic document 1312 was deleted in step S1403. For example, in some embodiments, the example GUI 1320 of FIG. 13C is presented on the display in response to selection of the File List button 1315 presented in the example GUI 1310 of FIG. 13B. Based on the selection of the File List button 1315, operations described with reference to FIG. 14 may be performed, in accordance with the restriction information received in step S1101. Thus, although the unencrypted electronic document 1312 has been deleted, the list of files 1322 in the example GUI 1320 includes the graphical element identifying the file name "Example.pdf" based on the encrypted electronic document that remains stored on the mobile computing device 200.

Referring to the example GUI 1320 of FIG. 13C, according to some embodiments, the graphical element identifying the file name "Document.pdf" is a graphical element representing an encrypted electronic document stored on the mobile computing device 200. Based on a user's selection of the indicator button associated with the "Document.pdf" file, the selected indicator button 1323 is presented. According to some embodiments, in response to selection of the Delete button 1325, the encrypted electronic document represented by the graphical element identifying the file name "Document.pdf" is deleted from the mobile computing device 200, and the graphical element identifying the file name "Document.pdf" is removed from the list of files 1322. According to some embodiments, in response to selection of the View button 1326, the encrypted electronic document represented by the graphical element identifying the file name "Document.pdf" is decrypted to generate an unencrypted electronic document associated with the file name "Document.pdf", and the unencrypted electronic document associated with the file name "Document.pdf" is displayed. Accordingly, an image of the unencrypted electronic document associated with the file name "Document.pdf" would be presented on the display of the mobile computing device 200.

According to some embodiments, the restriction information associated with file "Example.pdf" includes an instruction to prevent screenshots from being captured while the unencrypted electronic document is displayed. By way of example, the following restriction information indicated at FIG. 9 may have been selected, and implemented in step S1109: "Do not allow screenshots while displayed."

Based on the restriction information included in the message, the application 402 executing on the mobile computing device 200 restricts the availability of at least one function or feature of the mobile computing device 200. For example, one or more operations may be performed to prevent screenshots from being captured while the unencrypted electronic document is displayed.

For example, referring to FIG. 13B, the image of the unencrypted electronic document 1312 is presented in a window on the display of the mobile computing device 200. Thus, based on the restriction information, a mechanism may be implemented to ensure that a screenshot is not captured while the unencrypted electronic document 1312 is displayed. A flag associated with file "Example.pdf" may be set indicating that operations to prevent a screenshot should be performed in response to a screenshot command. In some embodiments, upon detecting a screenshot command, the application 402 executing on the mobile computing device 200 performs one or more of the following operations: close the window displaying the unencrypted electronic document 1312; exit the application 200; delete the unencrypted electronic document 1312; delete the unencrypted electronic document 1312 and files associated with it, such as the encrypted electronic document and the key for decrypting the encrypted electronic document; or other suitable operation(s) to prevent a screenshot while the image of the unencrypted electronic document 1312 is presented on the display. Additionally, a notification, for example to an administrator, may be sent in response to detecting a screenshot attempt while the image of the unencrypted electronic document 1312 is presented on the display.

According to some embodiments, the restriction information associated with file "Example.pdf" includes an instruction to prevent transmission of one or both of the encrypted electronic document and an unencrypted electronic document generated by decrypting the encrypted electronic document. By way of example, the following restriction information indicated at FIG. 9 may have been selected, and implemented in step S1109: "Do not allow transmission from device." In some embodiments, the instruction includes one or more specified transmission methods to be prevented, which may be one or more of the following transmission methods: via electronic mail as an attachment; via short-range wireless transmission using NFC, Bluetooth, or other suitable protocol; via a public network to a data storage service or web application; or by another suitable transmission method. In some embodiments, the instruction includes one or more specified transmissions methods that are permitted and one or more specified transmission methods to prevent.

Based on the restriction information included in the message, the application 402 executing on the mobile computing device 200 restricts the availability of at least one function or feature of the mobile computing device 200. For example, one or more operations may be performed to prevent transmission of one or both of the encrypted electronic document and an unencrypted electronic document generated by decrypting the encrypted electronic document.

For example, the application 402 executing on the mobile computing device 200 may maintain settings (for example, in a table, by setting flags, or in some other data structure) indicating prohibited and/or permissible methods of transmission associated with file "Example.pdf". The application 402 may receive, from an application, a request to access a file associated with the file name "Example.pdf" for the purpose of transmitting the file. For example, an electronic mail client application or the client application of a remote file hosting service may request access to the file. In some embodiments, in response to the request, the application 402 executing on the mobile computing device 200 may determine the transmission method based on the request and check the settings associated with file "Example.pdf" to determine whether the method of transmission is prohibited. If the transmission is prohibited, then the requested access is denied. On the other hand, if the transmission is permissible, then the requested access is granted. In some embodiments, granting access includes decrypting the encrypted electronic document to generate an unencrypted electronic document, and then sending the unencrypted electronic document in response to the request to access. In some embodiments, the application 402 executing on the mobile computing device 200 always denies access to the file associated with the file name "Example.pdf" based on restriction information including an instruction to prevent every type of transmission for the file.

According to some embodiments, the restriction information associated with file "Example.pdf" includes an instruction to prevent one or more applications from accessing one or both of the encrypted electronic document and an unencrypted electronic document generated by decrypting the encrypted electronic document. By way of example, the following restriction information indicated at FIG. 9 may have been selected, and implemented in step S1109: "Do not allow device applications to access." In some embodiments, the instruction specifies one or more prohibited operations, which may be one or more of the following prohibited operations: adding the document to a shared database; adding a reference to the document to a public directory; broadcasting information pertaining to the document to applications on the computing system; or other suitable mechanism to prevent applications from accessing the document.

Based on the restriction information included in the message, the application 402 executing on the mobile computing device 200 restricts the availability of at least one function or feature of the mobile computing device 200. For example, one or more operations may be performed to prevent one or more applications from accessing one or both of the encrypted electronic document and an unencrypted electronic document generated by decrypting the encrypted electronic document.

For example, the application 402 executing on the mobile computing device 200 may maintain settings (for example, in a table, by setting flags, or in some other data structure) indicating prohibited operations associated with file "Example.pdf". The prohibited operations may include one or more of the following: adding the document to a shared database; adding a reference to the document to a public directory; broadcasting information pertaining to the document to applications on the computing system; or other suitable mechanism to prevent applications from accessing the document. In some embodiments, the application 402 executing on the mobile computing device may perform one or more operations to implement the rules indicated by the settings. For example, in some embodiments, implementation of the settings includes disabling one or more features of the application 402, such as notification features. In some embodiments, implementation of the settings includes the application 402 denying one or more requests from one or more other application(s).

According to some embodiments, the restriction information associated with file "Example.pdf" includes one or more instructions to prevent one or more of the following: printing the unencrypted electronic document; editing the unencrypted electronic document; viewing the unencrypted electronic document prior to user authentication; or other suitable restriction. Based on the restriction information included in the message, the application 402 executing on the mobile computing device 200 performs one or more operations to carry out the requested restriction(s). For example, the application 402 may disable a print function with respect to the unencrypted electronic document; disable or deny access to features or tools for editing of the unencrypted electronic document; require credentials to be validated before the unencrypted electronic document can be displayed; or perform other suitable operations to carry out the requested restrictions.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the examples given above may also exist without departing from the scope of the invention. While particular examples of GUIs are illustrated, it will be understood that various other implementations of GUIs are within the scope of the present invention. For example, various features of the illustrated examples could be modified, rearranged, or removed, or one or more features could be added without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A system comprising:
one or more processors; and
one or more non-transitory computer-readable media including instructions that, when executed by the one or more processors, cause an image processing device to perform operations comprising:
initiating, at the image processing device, a scan operation to generate an electronic document representing a scanned physical document;
encrypting the electronic document;
storing the encrypted electronic document on the image processing device;
determining an output mode based on information associated with one or more settings, the output mode corresponding to a type of message to be output;
outputting the message in accordance with the output mode, the message including location information, a key, and restriction information, the location information for locating the encrypted electronic document stored on the image processing device, the key for decrypting the encrypted electronic document, the restriction information indicating a restriction associated with the encrypted electronic document;
receiving, at the image processing device from a computing device, a request for the encrypted electronic document, the request comprising a request the computing device sent based on the location information; and
sending, from the image processing device to the computing device, the encrypted electronic document based on the request,
wherein the restriction information includes one or more instructions which when executed on the computing device cause the computing device to restrict availability of at least one function or feature of the computing device in accordance with the restriction information in order to restrict, at the computing device, use of at least one of the encrypted electronic document and an unencrypted electronic document generated by decrypting the encrypted electronic document using the key.

2. The system of claim 1, wherein the restriction information is automatically included in the message based on a predetermined policy.

3. The system of claim 1, wherein the restriction information comprises an instruction to prevent transmission of at least one of the encrypted electronic document and the unencrypted electronic document.

4. The system of claim 1, wherein the restriction information comprises an instruction to prevent one or more applications from accessing at least one of the encrypted electronic document and the unencrypted electronic document.

5. The system of claim 1, wherein the restriction information comprises an instruction to prevent storage of the unencrypted electronic document.

6. The system of claim 1, the operations further comprising:
receiving, at the image processing device, one or more inputs via a user interface, the restriction information based on the one or more inputs.

7. The system of claim 1, wherein the outputting the message in accordance with the output mode comprises:
presenting a machine-readable code on a display of the image processing device, wherein the location information, the key, and the restriction information are encoded in the machine-readable code.

8. The system of claim 1, wherein the outputting the message in accordance with the output mode comprises:
sending, from the image processing device to a notification service, the message, an identifier, and a request to send the message to the computing device that is associated with the identifier.

9. The system of claim 1, wherein the outputting the message in accordance with the output mode comprises:
wirelessly outputting the message from a communication interface of the image processing device.

10. A method comprising:
initiating, at an image processing device, a scan operation to generate an electronic document representing a scanned physical document;

encrypting the electronic document;
storing the encrypted electronic document on the image processing device;
determining an output mode based on information associated with one or more settings, the output mode corresponding to a type of message to be output;
outputting the message in accordance with the output mode, the message including location information, a key, and restriction information, the location information for locating the encrypted electronic document stored on the image processing device, the key for decrypting the encrypted electronic document, the restriction information indicating a restriction associated with the encrypted electronic document;
receiving, at the image processing device from a computing device, a request for the encrypted electronic document, the request comprising a request the computing device sent based on the location information; and
sending, from the image processing device to the computing device, the encrypted electronic document based on the request,
wherein the restriction information includes one or more instructions which when executed on the computing device cause the computing device to restrict availability of at least one function or feature of the computing device in accordance with the restriction information in order to restrict, at the computing device, use of at least one of the encrypted electronic document and an unencrypted electronic document generated by decrypting the encrypted electronic document using the key.

11. A non-transitory computer-readable medium including instructions that, when executed by one or more processors, cause an image processing device to perform operations comprising:
initiating, at the image processing device, a scan operation to generate an electronic document representing a scanned physical document;
encrypting the electronic document;
storing the encrypted electronic document on the image processing device;
determining an output mode based on information associated with one or more settings, the output mode corresponding to a type of message to be output;
outputting the message in accordance with the output mode, the message including location information, a key, and restriction information, the location information for locating the encrypted electronic document stored on the image processing device, the key for decrypting the encrypted electronic document, the restriction information indicating a restriction associated with the encrypted electronic document;
receiving, at the image processing device from a computing device, a request for the encrypted electronic document, the request comprising a request the computing device sent based on the location information; and
sending, from the image processing device to the computing device, the encrypted electronic document based on the request,
wherein the restriction information includes one or more instructions which when executed on the computing device cause the computing device to restrict availability of at least one function or feature of the computing device in accordance with the restriction information in order to restrict, at the computing device, use of at least one of the encrypted electronic document and an unencrypted electronic document generated by decrypting the encrypted electronic document using the key.

12. A system comprising:
one or more processors; and
one or more non-transitory computer-readable media including instructions that, when executed by the one or more processors, cause a computing device to perform operations comprising:
receiving, at the computing device, a message output from an image processing device in accordance with an output mode that corresponds to a type of message, the message including location information for locating an encrypted electronic document stored on the image processing device, a key for decrypting the encrypted electronic document, and restriction information indicating a restriction associated with the encrypted electronic document, wherein receiving the message comprises receiving the type of message by performing, at the computing device, one or more operations in accordance with the type of message;
sending, from the computing device to the image processing device, a request for the encrypted electronic document based on the location information;
receiving, at the computing device from the image processing device, the encrypted electronic document based on the request;
decrypting the encrypted electronic document using the key to generate an unencrypted electronic document, the unencrypted electronic document representing a scanned physical document;
presenting an image of the unencrypted electronic document on a display of the computing device; and
restricting availability of at least one function or feature of the computing device in accordance with the restriction information in order to restrict, at the computing device, use of at least one of the encrypted electronic document and the unencrypted electronic document.

13. The system of claim 12, wherein the restricting availability of at least one function or feature of the computing device in accordance with the restriction information comprises:
preventing transmission of at least one of the encrypted electronic document and the unencrypted electronic document.

14. The system of claim 12, wherein the restricting availability of at least one function or feature of the computing device in accordance with the restriction information comprises:
preventing one or more applications from accessing at least one of the encrypted electronic document and the unencrypted electronic document.

15. The system of claim 12, wherein the restricting availability of at least one function or feature of the computing device in accordance with the restriction information comprises:
preventing storage of the unencrypted electronic document.

16. The system of claim 12, wherein the receiving the type of message comprises:
receiving the type of message wirelessly by a communication interface of the computing device.

17. The system of claim 12, wherein the receiving the type of message comprises:
reading, at the computing device, a machine-readable code associated with the image processing device; and
obtaining, at the computing device, information encoded in the machine-readable code by decoding the machine-readable code, the information encoded in the machine-readable code comprising the location information, the key, and the restriction information.

18. The system of claim 12, wherein the receiving the type of message comprises:
receiving, at the computing device from a notification service, the type of message.

19. A method comprising:
receiving, at a computing device, a message output from an image processing device in accordance with an output mode that corresponds to a type of message, the message including location information for locating an encrypted electronic document stored on the image processing device, a key for decrypting the encrypted electronic document, and restriction information indicating a restriction associated with the encrypted electronic document, wherein receiving the message comprises receiving the type of message by performing, at the computing device, one or more operations in accordance with the type of message;
sending, from the computing device to the image processing device, a request for the encrypted electronic document based on the location information;
receiving, at the computing device from the image processing device, the encrypted electronic document based on the request;
decrypting the encrypted electronic document using the key to generate an unencrypted electronic document, the unencrypted electronic document representing a scanned physical document;
presenting an image of the unencrypted electronic document on a display of the computing device; and
restricting availability of at least one function or feature of the computing device in accordance with the restriction information in order to restrict, at the computing device, use of at least one of the encrypted electronic document and the unencrypted electronic document.

20. A non-transitory computer-readable medium including instructions that, when executed by one or more processors, cause a computing device to perform operations comprising:
receiving, at the computing device, a message output from an image processing device in accordance with an output mode that corresponds to a type of message, the message including location information for locating an encrypted electronic document stored on the image processing device, a key for decrypting the encrypted electronic document, and restriction information indicating a restriction associated with the encrypted electronic document, wherein receiving the message comprises receiving the type of message by performing, at the computing device, one or more operations in accordance with the type of message;
sending, from the computing device to the image processing device, a request for the encrypted electronic document based on the location information;
receiving, at the computing device from the image processing device, the encrypted electronic document based on the request;
decrypting the encrypted electronic document using the key to generate an unencrypted electronic document, the unencrypted electronic document representing a scanned physical document;
presenting an image of the unencrypted electronic document on a display of the computing device; and
restricting availability of at least one function or feature of the computing device in accordance with the restriction information in order to restrict, at the computing device, use of at least one of the encrypted electronic document and the unencrypted electronic document.

* * * * *